(12) United States Patent
Ajitomi et al.

(10) Patent No.: US 10,547,605 B2
(45) Date of Patent: Jan. 28, 2020

(54) COMMUNICATION DEVICE, COMMUNICATION METHOD, COMMUNICATION SYSTEM, AND NON-TRANSITORY COMPUTER READABLE MEDIUM

(71) Applicant: KABUSHIKI KAISHA TOSHIBA, Minato-ku (JP)

(72) Inventors: Daisuke Ajitomi, Setagaya (JP); Keisuke Minami, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 351 days.

(21) Appl. No.: 15/462,546

(22) Filed: Mar. 17, 2017

(65) Prior Publication Data

US 2018/0007033 A1 Jan. 4, 2018

(30) Foreign Application Priority Data

Jul. 1, 2016 (JP) .................................. 2016-131904

(51) Int. Cl.
*H04L 29/06* (2006.01)

(52) U.S. Cl.
CPC ...... *H04L 63/0823* (2013.01); *H04L 63/0442* (2013.01); *H04L 63/061* (2013.01)

(58) Field of Classification Search
CPC .................................................. H04L 63/0823
See application file for complete search history.

(56) References Cited

U.S. PATENT DOCUMENTS

| 6,324,645 B1 * | 11/2001 | Andrews | H04L 9/006 |
| | | | 380/282 |
| 7,047,415 B2 * | 5/2006 | Doyle | H04L 63/0823 |
| | | | 713/156 |

(Continued)

FOREIGN PATENT DOCUMENTS

| JP | 2009-31849 | 2/2009 |
| JP | 4526809 | 8/2010 |

(Continued)

OTHER PUBLICATIONS

S. Blake-Wilson, et al. "Transport Layer Security (TLS) Extensions", The Internet Society, https://tools.ietf.org/html/rfc3546, 2003, 29 pages.

(Continued)

*Primary Examiner* — James R Turchen
(74) *Attorney, Agent, or Firm* — Oblon, McClelland, Maier & Neustadt, L.L.P.

(57) ABSTRACT

According to one embodiment, a communication device includes a first communicator capable of communicating with a server through a first network; a second communicator capable of communicating with an operation terminal of a user through a second network; a first communication processor to execute a first process; a second communication processor to receive, through the second communicator, an issue request, use identification information of the first communication processor, a first key, and a second key paired with the first key to issue a certificate signed by the second key including the identification information of the first communication processor and the first key, sign data to be signed by using a third key to generate signed data, and transmit the signed data and the certificate through the second communicator; and an authorizing processor to (Continued)

acquire permission information indicating permission by the user to issue the certificate.

18 Claims, 13 Drawing Sheets

(56) References Cited

U.S. PATENT DOCUMENTS

| | | | |
|---|---|---|---|
| 9,122,544 B2 | 9/2015 | Ajitomi et al. | |
| 9,225,525 B2* | 12/2015 | Fu | H04L 63/0823 |
| 9,525,557 B2 | 12/2016 | Tanaka et al. | |
| 2002/0138577 A1* | 9/2002 | Teng | G06F 21/41 |
| | | | 709/205 |
| 2004/0255113 A1 | 12/2004 | Ogura | |
| 2006/0059548 A1* | 3/2006 | Hildre | G06F 21/34 |
| | | | 726/9 |
| 2006/0075219 A1* | 4/2006 | Callaghan | H04L 63/0823 |
| | | | 713/156 |
| 2006/0200857 A1* | 9/2006 | Yokota | H04L 63/0823 |
| | | | 726/6 |
| 2008/0263215 A1* | 10/2008 | Schnellbaecher | H04L 63/0281 |
| | | | 709/229 |
| 2009/0112883 A1* | 4/2009 | Yoshioka | G06Q 10/10 |
| 2011/0213965 A1* | 9/2011 | Fu | H04L 63/0823 |
| | | | 713/158 |
| 2012/0246475 A1* | 9/2012 | Yoo | H04L 9/321 |
| | | | 713/168 |
| 2013/0198511 A1* | 8/2013 | Yoo | H04L 63/0823 |
| | | | 713/156 |
| 2013/0326214 A1* | 12/2013 | McCanna | H04L 9/3268 |
| | | | 713/156 |
| 2014/0281498 A1* | 9/2014 | Bransom | H04L 63/083 |
| | | | 713/156 |
| 2016/0088457 A1 | 3/2016 | Oyama et al. | |
| 2018/0270201 A1* | 9/2018 | Chanak | H04L 63/0272 |
| 2018/0288062 A1* | 10/2018 | Goyal | H04L 63/0281 |

FOREIGN PATENT DOCUMENTS

| | | |
|---|---|---|
| JP | 2012-49752 | 3/2012 |
| JP | 5624525 | 11/2014 |
| JP | 2015-142315 | 8/2015 |
| JP | 2015-222915 | 12/2015 |
| JP | 2016-63424 | 4/2016 |

OTHER PUBLICATIONS

D. Eastlake, "Transport Layer Security (TLS) Extensions: Extension Definitions", IETF Trust, https://tools.ietf.org/html/rfc6066, 2011, 25 pages.

"Server Name Indication (TLS Extension)", https://ja.wikipedia.org/wiki/Server_Name_Indication, 2016, 9 pages. (With English translation).

S. Cheshire, et al, "Multicast DNS", IETF Trust, https://tools.ietf.org/html/rfc6762, 2013, 70 pages.

"Activating New Mobile Services and Business Models with smartSD Memory cards", SD Association, https://www.sdcard.org/jp/downloads/pls/latest_whitepapers/Acitivating_New_ Mobile_Services_and_Business_Models_With_smartSD_Memory_Cards_Revsied_11-3-2014.pdf, 2014, 20 pages.

\* cited by examiner

SCREEN OF TELEVISION

"TV REMOTE CONTROL SERVICE IS REQUESTING ACCESS.
THE ACCESS INVOLVES ISSUE OF CERTIFICATE OF TV.
WOULD YOU LIKE TO ISSUE CERTIFICATE?"

[YES]   [NO]

ENTER ~151

FIG.5

WEB BROWSER SCREEN IN OPERATION TERMINAL

COMMUNICATION DEVICE, COMMUNICATION METHOD, COMMUNICATION SYSTEM, AND NON-TRANSITORY COMPUTER READABLE MEDIUM

CROSS-REFERENCE TO RELATED APPLICATIONS

This application is based upon and claims the benefit of priority from Japanese Patent Application No. 2016-131904, filed on Jul. 1, 2016; the entire contents of which are incorporated herein by reference.

FIELD

Embodiments of the present invention relate to a communication device, a communication method, a communication system, and a non-transitory computer readable medium.

BACKGROUND

It is difficult for a web server that provides a web service on the Internet to perform encrypted communication based on mutual authentication with a server operated in a device on a local network (hereinafter, simply called "device") through a web browser of a user. Specifically, there are the following three problems.
[1] The web browser (and a front end of the web server) cannot discover the device on the local network.
[2] The device does not have a regular server certificate. Therefore, the web browser (and the front end of the web server) cannot verify that the device on the local net is a reliable device.
[3] The device cannot control authentication and access for the web server and the user.

To solve the problem [1], the user figures out an IP address of the device in advance, and the web server side is provided with a registration interface for figuring out the IP address. The IP address can be set in the web server to realize access from the web server to the device.

To solve the problem [2], the user launches a certification authority and generates a root certificate signed by the certification authority. The user registers the root certificate in the web browser as a reliable certificate. The user herself generates a server certificate signed by the certification authority and sets the server certificate in the device. As a result, the user can cause the web browser to recognize that the device is a reliable device.

To solve the problem [3], a user ID and a password can be set in advance in the device, and the access can be controlled by requiring ID/password authentication when the web browser accesses the device.

However, the user needs to perform manual setting operation in all cases, and this is a problem in terms of usability. In the problems [2] and [3], the web server is not verifying the device as a legitimate device, and the device is not verifying the web server as a legitimate web server, respectively. Specifically, it is not verified that the web server and the device are servers with server certificates issued by a regular certification authority. Therefore, a malicious user can easily cause the web server and the device to communicate even if one of the web server and the device is "evil".

The main cause of the problem [2] is that the device does not have a reliable server certificate. However, the regular certification authority generally issues a certificate to a server with a globally accessible domain and with a clear management entity. A method in which the regular certification authority issues a regular server certificate to the device on the local network is not known.

An example of a related technique includes a method of issuing a certificate to a device. However, the technique is a method of issuing a client certificate for the device and is not a method of issuing a server certificate for safely accessing the device when the device behaves as a server.

When the device on the local network behaves as a server, the server includes an IP address that belongs to a private address space and that can be changed. The related technique has problems that cannot be solved, such as at what point of time a fixed name is provided to the server and how to issue a certificate for the name.

BRIEF DESCRIPTION OF THE DRAWINGS

FIG. 5 is a diagram showing an example of an authorization dialog displayed on a display of a device.

DETAILED DESCRIPTION

According to one embodiment, a communication device includes: a first communicator capable of communicating with a server through a first network; a second communicator capable of communicating with an operation terminal of a user through a second network; a first communication processor configured to execute a first process; a second communication processor and an authorizing processor. The second communication processor is configured to receive, through the second communicator, an issue request, configured to use identification information of the first communication processor, a first key, and a second key paired with the first key to issue a certificate signed by the second key including the identification information of the first communication processor and the first key, configured to sign data to be signed by using a third key to generate signed data, the data to be singed being included in the issue request or pre-shared, and configured to transmit the signed data and the certificate through the second communicator. The authorizing processor is configured to acquire permission information indicating permission by the user to issue the certificate.

Embodiments of the present invention will now be described with reference to the drawings.

<First Embodiment>

Figure 1:
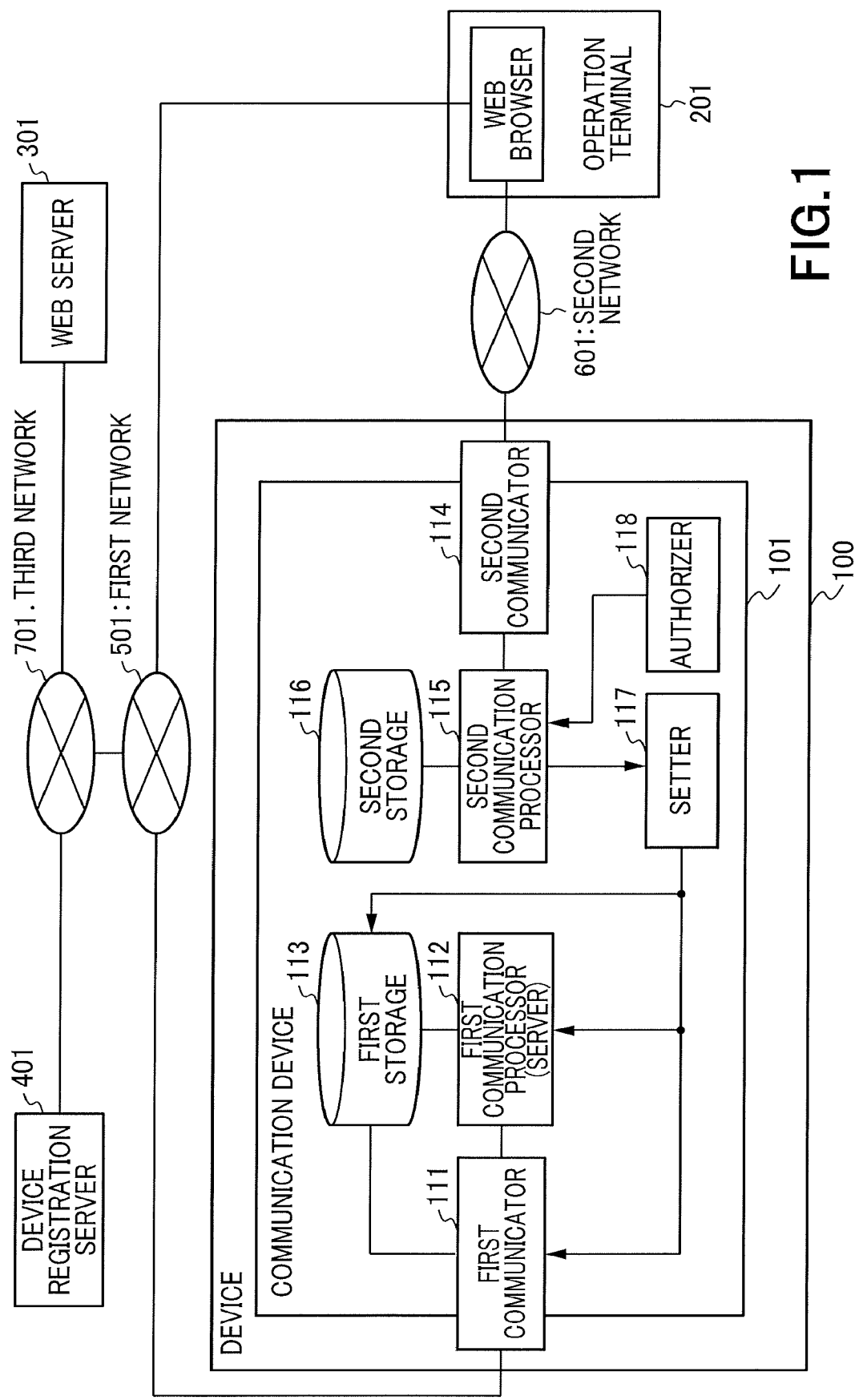
FIG. 1 is a diagram showing an overall configuration of a system including a communication device related to a first embodiment.

FIG. 1 shows an overall configuration of a system including a communication device 101 according to a first embodiment.

The communication device 101 is mounted on a device 100 possessed by a user. Although the device is a digital television (hereinafter, called "television") in the case illustrated in the present embodiment, the device is not limited to this. For example, the communication device may be mounted on another type of device, such as another home appliance, housing equipment, and factory and building equipment. The device has functions necessary for a television, such as a display and a television tuner. The communication device 101 includes means (first communicator 111 and second communicator 114) for communicating with a web server 301 and an operation terminal 201.

The operation terminal 201 is a terminal device (user terminal) operated by the user. Examples of the operation terminal 201 include a PC (personal computer), a smartphone, and a tablet. The operation terminal 201 is provided with a web browser for accessing a web service provided by the web server 301. In the present embodiment, it is assumed that the operation terminal 201 is a smartphone. The user uses the web service provided by the web server 301 through the web browser to access the communication device 101.

The operation terminal 201 is connected to the web server 301 through a first network 501 and a third network 701. The operation terminal 201 is also connected to the second communicator 114 of the communication device 101 through a second network 601. The operation terminal 201 is also connected to the first communicator 111 of the communication device 101 through the first network 501. The web server 301 is connected to the first communicator 111 of the communication device 101 through the third network 701 and the first network 501. The web server 301 is also connected to a device registration server 401 through the third network 701.

The first network 501 is a local network in a house, an office, a factory, or the like. Although it is assumed that the medium of communication is a medium that can realize IP communication in upper layers, such as Ethernet (registered trademark) and wireless LAN, the medium and the upper communication protocols are not limited to these. In the present embodiment, it is assumed that the first network 501 is a home network constructed by a wireless LAN.

The second network 601 is a network that allows the operation terminal 201 to safely (without leakage of information) communicate with the communication device 101. Specifically, examples of the second network 601 include a USB, an HDMI (registered trademark), and an SDIO that directly connect the communication device 101 and the operation terminal 201, short-range wireless communication, such as NFC, and highly safe short-distance wireless communication, such as BLE (Bluetooth low energy). The operation terminal 201 is connected to the communication device 101 through the BLE in the case illustrated in the present embodiment.

The third network 701 is a WAN (wide area network), such as the Internet. The communication between the operation terminal 201 and the web server 301 and the communication between the web server 301 and the device registration server 401 are performed through the third network 701. The third network 701 is the Internet in the case illustrated in the present embodiment.

The web server 301 is a globally accessible server that provides a web service on the Internet. The entity of the web server 301 can be either a physical machine or a virtual machine. It is assumed that the web server 301 is, for example, an HTTP server. The web server 301 includes a front end and a back end. The front end is a web page provided by the web service including HTML, CSS, JavaScript (registered trademark), and the like. The back end is a part that performs a main function (server function) of the web service provided by the web server 301. However, the protocol and the device configuration of the web server 301 are not limited to these.

The web service provided by the web server 301 discovers the device 100 (or the communication device 101) on the first network 501 through the operation terminal 201 and provides the user with functions provided by the device 100. These operations are performed through web pages displayed by the web browser of the operation terminal 201.

The communication device 101 provides a television remote control function as a function of the device (television here). The web service receives a request for the operation of the television remote control function through the web page of the operation terminal 201. The user can input a remote control instruction in the web page to operate the television through the web service. More specifically, the user operates the television possessed by the user through a web screen of the television remote control service displayed by the web browser of the operation terminal 201 of the user. The remote control instruction input by the user is transmitted from the web browser to the communication device 101 through the front end and the first network 501. The communication device 101 executes the execution request to realize the remote control operation of the television by the user.

The device registration server 401 is an HTTP server developed on the third network 701 (such as the Internet). The entity of the device registration server 401 can be either a physical machine or a virtual machine. The protocol and the device configuration of the device registration server are not limited to these. The device registration server 401 has a function of receiving a request (local server verification request described later) from the web server to generate a challenge code (data to be signed). The device registration server 401 also receives a signed code (signed data) generated by the communication device 101 through the web server and uses a pre-shared key shared with the communication device 101 to verify the signed code. Specifically, the device registration server 401 determines whether the received signed code matches the code obtained by using the pre-shared key to sign the challenge code key or determines whether the data obtained by decoding the signed code by the pre-shared key matches the challenge code. Incidentally, the challenge code may be pre-shared with the communication device 101. In this case, the device registration server does not need to generate the challenge code. Alternatively, the device registration server may generate a value for identifying any one of at least one challenge code for notification to the communication device 101 via the Web server. The communication device 101 may specify the corresponding challenge code based on the notified value among previously holding at least one challenge codes.

As described, the device registration server 401 shares, with the communication device 101, the pre-shared key that is a secret key. An operating company of the device registration server 401 inspects an information confidentiality level or a supported protocol of the communication device 101 and then issues the pre-shared key to the communication device 101. An example of the information confidentiality level includes whether a secure element is mounted to implement a countermeasure for preventing leakage of the pre-shared key. An example of the supported protocol includes whether a scheme of creating or transferring a key pair (secret key and public key) and a server certificate described later corresponds to a standard supported by the device registration service. The manufacturer of the communication device 101 or the device 100 writes the pre-shared key in a safe storage area before the shipment. Although it is assumed that the pre-shared key is issued on the basis of a model number (model) of the communication device 101 or the device 100, there are many variations of the basis on which the keys are issued. For example, each of the communication device 101 and the device 100 may have a unique pre-shared key, or each product series across a plurality of models may have a unique pre-shared key. The form of realizing the pre-shared key can be any form.

The communication device 101 includes the first communicator 111, a first communication processor 112, a first storage 113, the second communicator 114, a second communication processor 115, a second storage 116, a setter 117, and an authorize processor (which is called an authorizer below) 118.

The first communicator 111 is a communication module that communicates with the web server 301 and the operation terminal 201 through the first network 501. The first communicator 111 is a Wi-Fi transmitter and receiver in the present embodiment. The first communicator 111 is formed by, for example, a communication circuit. The communication circuit may be formed by only hardware or may be formed by hardware and software.

The first communication processor 112 provides a resource (such as a remote control function) of the device to the operation terminal 201 (more specifically, the web browser on the operation terminal 201) through the first communicator 111. Providing the resource is equivalent to, for example, execution of a first process by the first communication processor 112. The front end of the web server 301 accesses the first communication processor 112 through the web browser of the operation terminal 201. Although it is assumed that the first communication processor 112 is an HTTP server, other protocols (such as CoAP and MQTT) may be used as long as the protocols are supported by the web browser.

The first storage 113 stores configuration information (such as a configuration file of the HTTP server) regarding the operation of the first communicator 111 and the first communication processor 112. The first storage 113 is a non-volatile storage such as a non-volatile memory. Examples of the first storage 113 include an SSD, a hard disk, and a FRAM (registered trademark). However, the form of the first storage 113 is not limited to these.

The second communicator 114 is a communication module that communicates with the operation terminal 201 through the second network 601. As described, it is assumed that the second communicator 114 is a BLE transmitter and receiver in the present embodiment. The second communicator 114 is formed by, for example, a communication circuit. The communication circuit may be formed by only hardware or may be formed by hardware and software.

The second communication processor 115 communicates with the operation terminal 201 (more specifically, the web browser on the operation terminal 201) through the second communicator 114. The second communication processor 115 has a main function of realizing a communication sequence described later. Specifically, the second communication processor 115 provides information of the device according to a search request from the operation terminal 201. The second communication processor 115 also has a function of generating a key pair (public key and secret key) according to a request from the web browser, storing the secret key in the first storage 113, and providing the public key. The data encrypted by the public key can be decoded by only the secret key, and the data encrypted by the secret key can be decoded by only the public key. The second communication processor 115 has a function of using this basic function to issue a server certificate and a certificate signing request based on authorization from the user. In the present embodiment, it is assumed that the second communication processor 115 issues the server certificate.

The second storage 116 stores configuration information (such as a pre-shared key shared with the device registration server 401) regarding the operation of the second communicator 114 and the second communication processor 115. Note that the pre-shared key may be stored in the first storage 113. The second storage 116 is a non-volatile storage such as a non-volatile memory. Although examples of the second storage 116 include an SSD, a hard disk, and a FRAM, the second storage 116 is not limited to these. The second storage 116 may be physically the same as or different from the first storage 113.

The setter 117 sets and changes the first communication processor 112 based on an instruction of the second communication processor 115. The setter 117 can also write and read from the first storage 113.

The authorizer 118 has a function of receiving, from the user, operation indicating authorization for accessing the communication device 101 from the web service through the interface included in the device. When the authorization of the user is received, the authorizer 118 outputs, to the second communication processor 115, permission information indicating that the user authorization is obtained.

Figure 2:
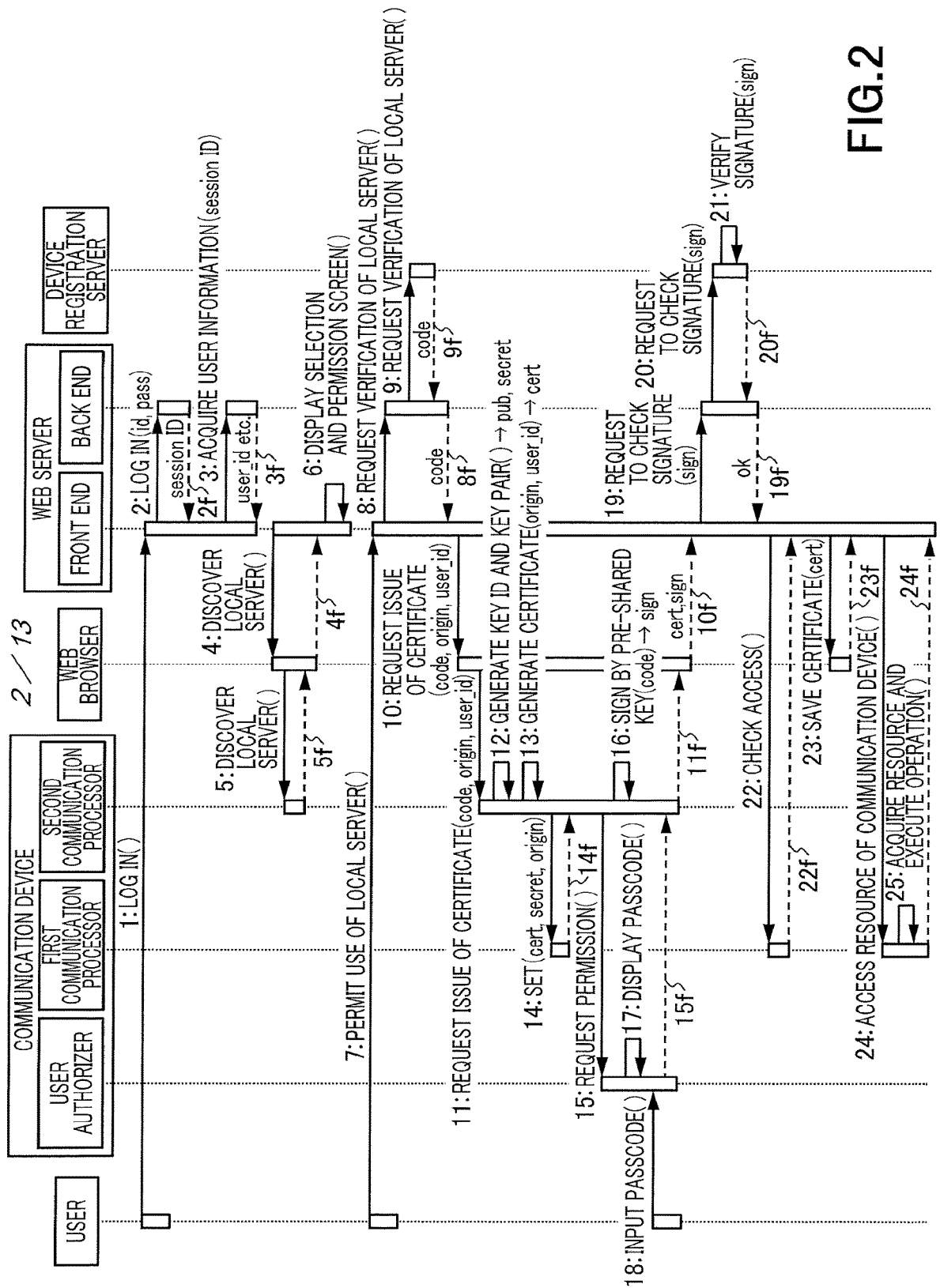
FIG. 2 is a diagram showing a communication sequence according to the first embodiment.

FIG. 2 shows a communication sequence according to the first embodiment. The following user scenario is illustrated in the present communication sequence.

The user at home logs in to the web service (television remote control service) provided by the web server 301 on the third network 701 (such as the Internet) from the web browser on the operation terminal 201. The front end of the web server 301 provides the web page on the browser. The front end of the web server 301 searches and discovers the device (television) on the first network 501 (home LAN). When the user authorizes the web service to access the device 100 (more specifically, the communication device 101), the user can execute the function of the resource (remote control operation of television) provided by the communication device 101 through the web page.

It is assumed that the pre-shared key generated by the device registration server 401 on the basis of the model number is stored in the first storage 113 of the communication device 101. The first storage 113 is a secure area that cannot be accessed from the outside of the communication device 101. The BLE communication function is mounted on the second communicator 114 of the communication device 101 and on the operation terminal 201. A function (web Bluetooth API) of discovering a Bluetooth device around the second network 601 is mounted on the web browser.

The user accesses the web service provided by the web server 301 from the web browser of the operation terminal 201 and transmits a login request including a user ID and a password (step 1).

The front end of the web server 301 transmits the login request to the back end (step 2). The back end performs user authentication and enters a login session when the user authentication is successful. In this case, the back end issues a session ID ("session ID") and manages the session ID in association with the user information. The back end transmits the session ID to the front end (step 2f). However, the form of realizing the login session is not limited to this. The communication between the front end and the back end of the web service is generally encrypted by TLS.

The front end transmits a user information acquisition request including the session ID to the back end (step 3). The back end specifies the user information associated with the session ID and transmits the user information to the front end (step 3f). The user information is a user ID, an e-mail address, or the like that can uniquely identify the user in the web server. In FIG. 2, "user_id" represents the user information.

The user information may be transmitted along with the session ID in step 2f. Alternatively, the user information may be transmitted along with a challenge code ("code") in response to a local server verification request described later (step 8f). Methods other than the methods described here may be used to provide the user information to the front end.

The front end transmits a discovery request of a peripheral BLE device to the web Bluetooth API mounted on the web browser of the operation terminal 201 (step 4).

The web browser of the operation terminal 201 searches for a peripheral device (BLE device here) in response to the discovery request (step 5) and discovers the device 100 by receiving a response (step 5f). The web browser discovers a television as the device 100 here. The web browser transmits the information of the discovered device 100 to the web server 301 (step 4f).

The front end of the web server 301 displays the information of the discovered device 100 (television) on the web browser of the operation terminal 201 (step 6). This prompts the user to determine approval or denial of the access from the web service to the television. The user may be asked to select a target device on a selection screen when there are a plurality of devices.

The user presses a permission button displayed on the web browser to authorize the access from the web service to the device 100 (television). Permission information is transmitted from the web browser to the web server 301 (step 7). As a result, the web server 301 recognizes that the access is authorized by the user.

The front end of the web server 301 transmits a verification request (local server verification request) of the discovered device 100 to the device registration server 401 through the back end (steps S8 and S9). The verification denotes an act of checking that the device 100 is the communication device 101 (device) including the pre-shared key correctly registered in the device registration server 401. It is assumed that a reliable relationship is constructed in advance between the device registration server 401 and the web server 301. Specifically, the device registration server 401 may issue credentials (identification information and secret key) to the web server 301 in advance as in the relationship between an authorization server and an RP (relying party) in OAuth, and the device registration server 401 may authenticate the web server 301 based on the credentials and encrypt the communication.

The device registration server 401 issues a challenge code (data to be signed) that is a random character string in response to the verification request and transmits the challenge code to the web server 301 (step 9f). In FIG. 2, "code" represents the challenge code. The web server 301 receives the challenge code through the back end and transmits the challenge code to the front end. At this time, the device registration server 401 may transmit, to the web server 301, a candidate list (signature algorithm list) of algorithms used by the communication device 101 to sign the challenge code. In this case, the web server 301 receives the signature algorithm list and the challenge code through the back end and transmits the signature algorithm list and the challenge code to the front end. It is assumed here that the signature algorithm list is also transmitted to the web server 301. As described later, the device 100 uses the pre-shared key to receive and verify the signed code that is data with a signature in the challenge code ("code"), and in this way, the device registration server 401 validates the device 100.

The front end transmits a certificate issue request to the web browser through the JavaScript API, the certificate issue request including the challenge code ("code"), origin information ("origin") for identifying the web service, the user information ("user_id"), and the signature algorithm list (step 10). It is assumed here that the origin information is "https://tvcontrol.com". Note that "tvcontrol.com" as part of the origin information is equivalent to a domain. The user information may include attributes other than the identification information, such as a display name. Incidentally, in the case where the communication device 101 pre-shares the challenge, the transmission of the challenge code may be omitted. The device registration server 401 may omit the generation of the challenge code or pass a value for identifying the used challenge code to the front end to make the front end transmit the challenge code. In this case, the communication device 101 may specify the corresponding challenge code based on the notified value.

The web browser forwards the certificate issue request to the second communication processor 115 through the second network 601 (step 11).

When the certificate issue request is received, the second communication processor 115 uses a public key encryption algorithm, such as RSA, to generate a key pair including the secret key ("secret") and the public key ("pub") (step 12). The second communication processor 115 also generates a key ID for identifying the key pair. The key pair is generated for each combination of the web service and the user, for example. In this case, a different key ID is provided to each combination.

The key ID may not be generated when a single key pair is reused regardless of the combination of the web service and the user. In this case, the generation of the key pair does not have to be triggered by the reception of the certificate issue request (step 11). The key pair may be generated only when the certificate issue request is received for the first time. A different key pair is generated for each combination of the web service and the user in the case illustrated in the present embodiment.

The second communication processor 115 uses identification information of the first communication processor 112 to generate a server certificate ("cert") from the key pair (step 13). A local IPv4 address, an IPv6 address, or the like can be used as the identification information of the first communication processor 112, for example. Identification information other than the IP address, such as a MAC address and an identifier allocated to the communication device 101 by the wires LAN protocol, can also be used. Although the operation terminal and the device (television) are separated in the present embodiment, the one and only host name or address unique to the device, such as a localhost and a loop back address (127.0.0.1), may be used as the device identification information in a case in which the device and the operation terminal are integrated (case in which the television is provided with the web browser, and the user displays the web screen of the web service through the web browser of the television). Although the specific format and version of the server certificate do not matter, it is assumed here that the self-signed certificate is in an X.509 format. The server certificate includes, for example, a signature based on various attributes, a public key, and a secret key.

Here, the second communication processor 115 sets one or both the origin information ("origin") and the user information ("user_id") for issuer attributes of the server certificate. The second communication processor 115 also sets the identification information of the first communication processor 112 for an attribute to be issued of the server certificate. Since the self-signed certificate is issued in the form adopted in the present embodiment, the issuer attributes may or may not be used.

The second communication processor 115 instructs the setter 117 to set the server certificate and the secret key in the first communication processor 112 (step 14). The setter 117 sets the server certificate and the secret key in response to the instruction (same step 14).

The second communication processor 115 instructs the setter 117 to set CORS (cross-origin resource sharing) (authorization of access from specific origin) in the first communication processor 112 as necessary. The setter 117 sets the CORS in the first communication processor 112 in response to the instruction. Specifically, the setter 117 registers the origin information in a white list. The first communication processor 112 permits access from the origin information registered in the white list even if the access is from an origin different from the origin of the device.

The setting in the first communication processor 112 generally involves control, such as restart of the first communication processor 112 and a setting reread command, and the setter 117 controls the first communication processor 112 as necessary.

When the setting is completed, the second communication processor 115 receives a completion notification from the first communication processor 112 through the setter 117 (step 14*f*).

The second communication processor 115 transmits, to the authorizer 118, a permission request for requesting the authorization of the user to issue the server certificate (step 15). In this case, the user information ("user_id") may be transferred for the display in subsequent step 17. The second communication processor 115 waits a certain period for the response from the authorizer 118. If the response is not obtained or if a denial response from the user is received, the authorizer 118 returns an error to the web browser.

While the second communication processor 115 waits for the response from the authorizer 118, the second communication processor 115 uses the pre-shared key to sign the received challenge code ("code") to generate a signed code ("sign") (step 16). The signed code is equivalent to signed data obtained by encrypting the challenge code by the pre-shared key. The algorithm of the signature used in this case may be arbitrarily selected from the signature algorithm list. Although the signing process is executed while the second communication processor 115 waits for the response from the authorizer 118, the signing process may be executed any time after the reception of the certificate issue request, before the acquisition of the authorization for issuing the server certificate. Incidentally, in the case where the challenge code is be pre-shared with the communication device 101, the second communication processor 115 may sign the pre-shared challenge code. Alternatively, in the case where the communication device 101 receives a value for identifying the used challenge code, the second communication processor may specify the corresponding challenge code based on the notified value among previously holding at least one challenge codes.

When the authorizer 118 receives the permission request, the authorizer 118 uses a predetermined method to ask the user for the authorization to issue the server certificate. For example, a PIN code (such as four-digit number) that is a passcode is displayed on the screen of the television along with words for obtaining the authorization to issue the certificate. In this way, the user is asked to input the PIN code through the television remote control.

This is just an example, and in place of the display of the passcode, a pop-up display for requesting the press of a specific key (such as an enter button) may be displayed on the screen of the device 100 (television screen). The television may include a biometric authenticator, such as a camera and a fingerprint reader, and the biometric authenticator may be used to ask the user for the authorization. The television may have a setting function of the user password, and the user may re-enter the user password for the authorization by the user.

The user inputs the passcode to authorize the issue of the server certificate (step 18). When the authorizer 118 receives the same passcode as the passcode displayed on the television screen, the authorizer 118 determines that the user has authorized the server certificate. The authorizer 118 notifies, to the second communication processor 115, permission information indicating that the user has authorized the server certificate (step 15*f*). The authorizer 118 may return an error response if the authorization information of the user is not obtained within a time out period or if the value of the passcode is wrong for a certain number of times. In this case, the second communication processor 115 may delete the issued server certificate. The second communication processor 115 may control the first communication processor 112 not to use the issued server certificate. Therefore, the second communication processor 115 controls the first communication processor 112 to issue or use the certificate only if the authorization information of the user is obtained. The order of steps can be changed to issue the server certificate after the authorization information of the user is obtained.

The second communication processor 115 transmits, to the web browser, a response including the server certificate ("cert"), the signed code ("sign"), and the identification information of the selected signature algorithm (step 11*f*). The web browser forwards the response to the front end of the web server 301 (step 10*f*). When the signature algorithm is not selected, the transmission of the identification information of the signature algorithm in steps 11*f* and 10*f* is not necessary.

The front end that has received the response transmits a signature check request including the signed code ("sign") to the back end (step 19).

The back end forwards the signature check request to the device registration server 401 (step 20). In this way, the back end requests the device registration server 401 to verify the signed code ("sign").

The device registration server 401 uses the pre-shared key shared with the communication device 101 to verify the signed code ("sign"). When the device registration server 401 can confirm that the signed code ("sign") is a code obtained by using the pre-shared key to sign the challenge code ("code"), the device registration server 401 transmits a success response to the back end (step 20*f*). The back end notifies the success of the verification to the front end (step 19*f*).

When the notification of the success of the verification is received, the front end checks the access based on secure communication with the first communication processor 112 of the communication device 101 through the first network 501 (step 22). Typically, the access check is a communication test in the used protocol (HTTPS here). However, as described in the description of the first communication processor 112, the used protocol may be other protocols (such as COAPS).

The identification information (such as IP address) of the first communication processor 112 included in the server certificate ("cert") may be used for the information of the access destination in this case. The information of the access destination may be transferred to the front end through the web browser in step 11f described above (response to the certificate issue request from the web browser), and the information may be used to check the access.

It is assumed in the present embodiment that the server certificate ("cert") for the local IP address (192.168.11.2) is issued, and the front end checks the access to "https://192.168.11.2/.well_known" based on the address (192.168.11.2) set for the attribute to be issued of the server certificate ("cert"). Note that ".well_known" denotes the end point for returning the attribute information of the local server (first communication processor), and it is not necessary to use ".well_known". The form does not matter, and "index.html" may be used. Note that "https" (hypertext transfer protocol secure) is a protocol for HTTP communication on a secure connection provided by SSL (secure sockets layer)/TLS (transport layer security) protocol.

If the access to the first communication processor 112 has failed, the front end may delete the server certificate set for the first communication processor 112 through the second communication processor 115. Although the communication testing process is executed by the front end side, the JavaScript API may be provided on the web browser side, and the front end may cause the web browser to execute the communication testing process through the API.

If the access to the first communication processor 112 is successful (step 22*f*), the front end registers (saves), in the web browser, the server certificate as a reliable server certificate of the web browser (steps 23 and 23*f*). A specific example of the method of saving the server certificate includes a method in which the JavaScript API for registering the certificate is provided on the web browser, and the front end calls the API to register the certificate. The front end may display a pop-up on the web browser to ask the user to authorize the saving, and the user may press an authorization button to directly save the server certificate.

The user transmits a command for requesting access to the resource of the device 100 to the front end of the web server 301 through the web browser (step 24). The resource of the communication device 101 here is the remote control function of the television. Examples of the remote control function include changing the channel, turning on and off the power, and reserving recording of a video. When the front end receives information of remote control operation from the web browser, the front end performs HTTPS communication with the first communication processor 112 through the first network 501 and transmits the access request (instruction information of the remote control operation) to the resource.

More specifically, the front end verifies the server certificate during TLS handshake with the first communication processor 112 in the HTTPS communication. When the server certificate set for the web browser and the server certificate set for the first communication processor 112 match, the front end (more specifically, the web browser connected to the front end) determines that the device 100 is reliable, and safe encrypted communication is realized hereafter between the first communication processor 112 and the web browser.

The origin information of the web server 301 and the origin information of the first communication processor 112 of the communication device 101 are different, and the access from the front end to the first communication processor 112 is cross-origin access (access between different origins). The origin information of the web server 301 is registered in the white list of the first communication processor 112, and the first communication processor 112 allows access (cross-origin) from the different origin information.

When the first communication processor 112 receives a command of the access request (information of the remote control operation) for the resource under the safe encrypted communication, the first communication processor 112 executes the remote control function, such as changing the channel, according to the command.

Figure 3:
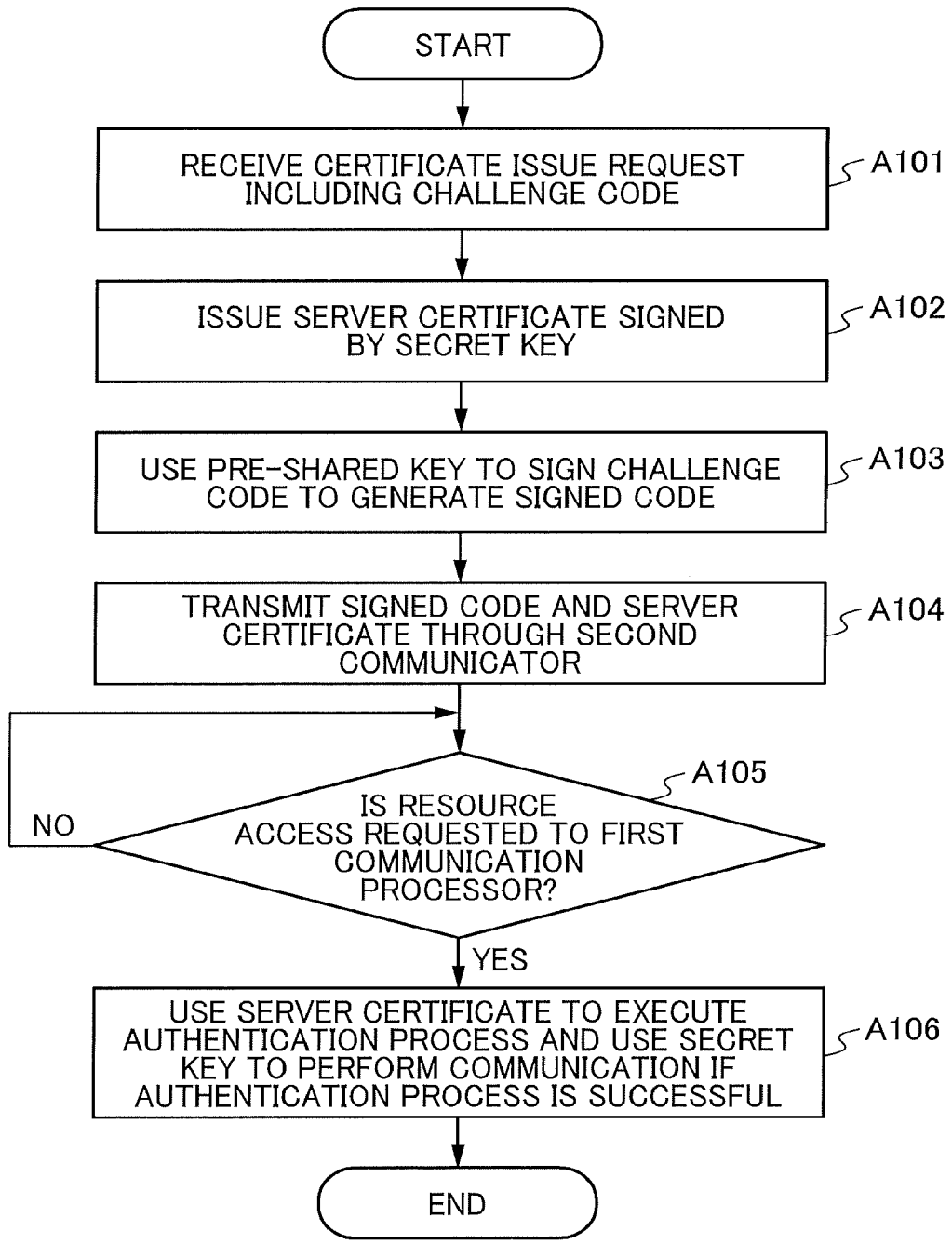
FIG. 3 is a flow chart of operation of the communication device according to the first embodiment.

FIG. 3 is a flow chart of operation of the communication device 101 according to the present embodiment. The second communication processor 115 receives a certificate issue request including the challenge code (data to be signed) through the second communicator 114 (step A101). The certificate issue request corresponds to, for example, a first mode of an issue request.

The second communication processor 115 generates a pair of the secret key and the public key and uses the identification information of the first communication processor 112 and the public key and the secret key to issue a server certificate including the identification information of the first communication processor 112 and the public key and signed by the secret key (step A102). The server certificate corresponds to, for example, a first certificate. The public key and the secret key are equivalent to, for example, a first key and a second key paired with the first key. The server certificate is signed by, for example, using the secret key to encrypt data including the identification information and the public key or a hash value of the data to generate signed data. The server certificate includes the data and the signed data.

The second communication processor 115 uses the pre-shared key to sign the challenge code to generate a signed code (signed data) (step A103). For example, the pre-shared key held by the communication device 101 is equivalent to a third key, and the pre-shared key held by the device registration server 401 is equivalent to a seventh key. The second communication processor 115 sets the server certificate and the secret key in the first communication processor 112.

The second communication processor 115 transmits the signed code and the server certificate through the second communicator 114 (step A104). The signed code is transmitted to the device registration server 401 through the operation terminal 201 and the web server 301. The device registration server 401 verifies the signed code, and when the verification is successful, the device registration server 401 transmits a notification of the success to the web server 301. The server certificate is transmitted to the web server 301 through the operation terminal, and when the notification of the success is received, the web server 301 saves, in the web browser, the server certificate as a reliable server certificate.

When the first communication processor 112 receives a command for requesting access (first process) to the resource, such as remote control operation, through the first communication 111, the first communication processor 112 uses the server certificate for an authentication process with the sender of the command (step A105 and A106). The sender (web browser) communicates with the sender of the command to access the resource (operation such as remote control operation) only when the first communication processor 112 is successful in verifying that the certificate is reliable (same step A106).

As described, the present embodiment allows safe cross-origin access from the web server 301 to the device 100 on the first network 501 (such as local network). Specifically, the retention of the pre-shared key by the device 100 is guaranteed in advance by the device registration service, and the web server and the web browser determine that the server certificate issued by the device 100 is reliable based on the guarantee and the permission of the user as the owner of the device 100. Meanwhile, the user already holds the account of the web service and trusts the web service. Based on this precondition, the user admits the access from the web server to the device 100 with a clear intension. The HTTPS cross-origin access based on the mutual authentication with the involvement of the user is realized, except that the device 100 itself cannot directly authenticate the web server (and the device registration server).

<Second Embodiment>

The communication device issues a self-signed certificate as the server certificate in the first embodiment. A certificate signing request (CSR) is issued in a mode illustrated in the present embodiment, and a certification authority signs the certificate signing request to issue a certificate. The server certificate is issued to the IP address of the first communication processor 112 in the present embodiment. The server certificate is issued to a local domain name set in the first communication processor 112 in the present embodiment.

Although the system configuration diagram of the present embodiment is the same as in FIG. 1, functions of part of the elements are extended or changed. Differences from the first embodiment will be mainly described.

As a difference from the first embodiment, the communication device 101 issues a certificate signing request (CSR) instead of the server certificate.

The first communicator 111 of the communication device 101 has a setting function of a domain name (local domain name) in the first network (local network) 501. For example, the first communicator 111 has a function of an mDNS (multicast domain name system) client.

As in the first embodiment, the first storage 113 functions to store the setting related to the first communicator 111 and the first communication processor 112. The present embodiment is different from the first embodiment in that the first storage 113 stores domain-related configuration information. An example of the configuration information stored in the first storage 113 includes a configuration file (including the domain name, the IP address, and the like) of the mDNS client.

As a difference from the first embodiment, the device registration server 401 functions as a certification authority, that is, has a function of issuing a server certificate based on the CSR. For example, the device registration server 401 uses the secret key to sign the CSR to issue the server certificate. The secret key is a secret key that can be verified by the server certificate (public key) of the device registration server (regular certification authority in this case). The secret key corresponds to, for example, a fourth key.

Figure 4:
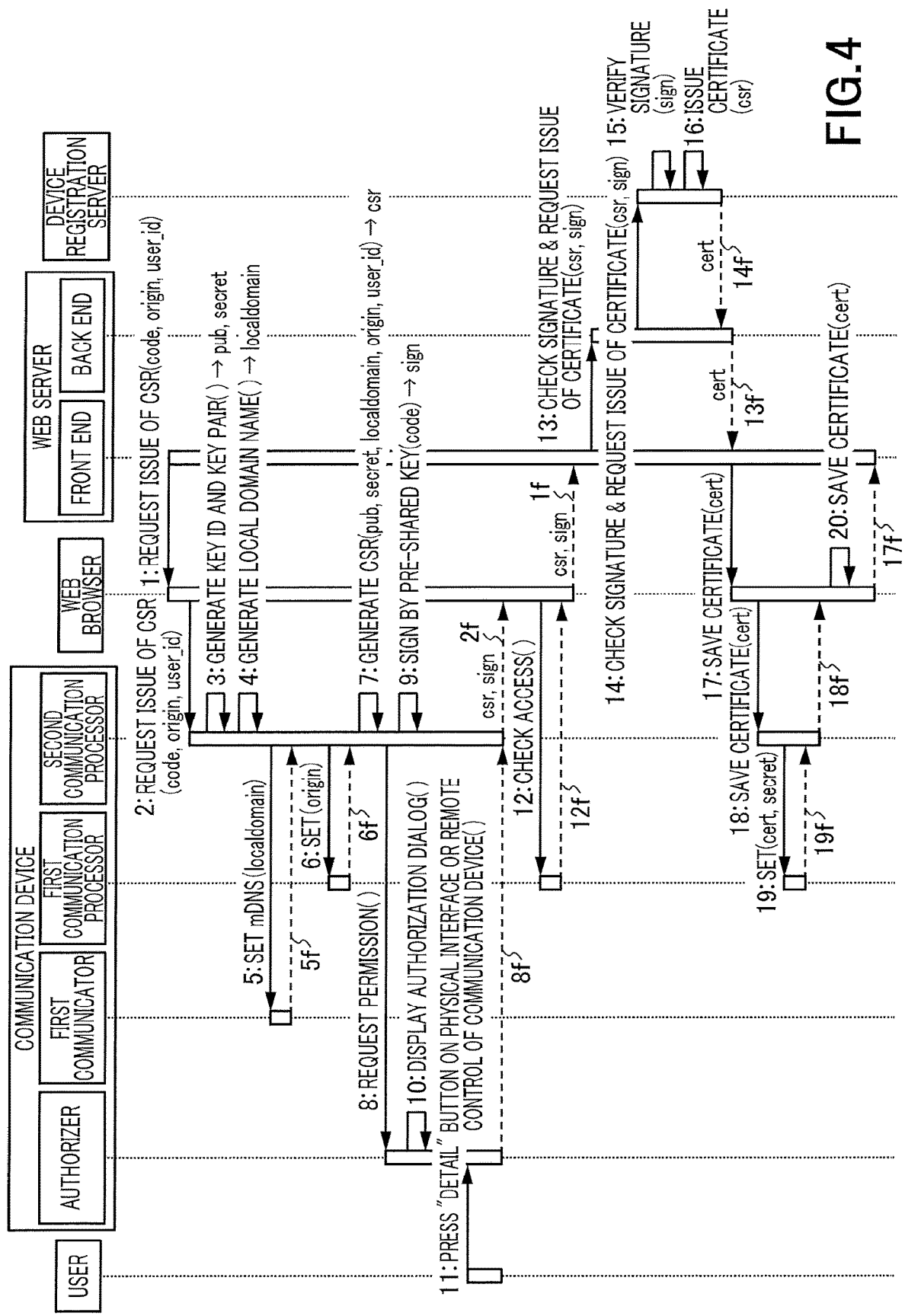
FIG. 4 is a diagram showing a communication sequence of a system according to a second embodiment.

FIG. 4 shows a communication sequence of a system according to a second embodiment. Although steps 1 to 8f (up to the issue of the challenge code) of FIG. 2 in the first embodiment are executed before the start of the sequence of FIG. 4, steps 1 to 8f are not illustrated. Although steps 24 to 24f (access to the resource) of FIG. 2 are executed after the sequence of FIG. 4, steps 24 to 24f are not illustrated.

As shown in FIG. 4, the front end of the web server 301 transmits a CSR (certificate signing request) issue request to the web browser, instead of the issue request of the certificate (step 1). The CSR issue request includes the challenge code ("code"), the origin information ("origin"), and the user information ("user_id").

The web browser forwards the CSR issue request to the second communication processor 115 (step 2).

As in step 12 of FIG. 2, the second communication processor 115 generates a key pair (public key and secret key) (step 3).

The second communication processor 115 generates a local domain name ("localdomain") that is effective only in the first network 501 and that can be followed even when the local IP address is changed (step 4). For example, the domain name ("tvcontrol.com") of the web service may be used to generate a local domain name "tvcontrol.com.local". Furthermore, when the user information ("user_id") is the account name of the user, and the account name is "alice", a local domain name "alice.tvcontrol.com.local" may be generated. Alternatively, the key ID ("key_id") with the uniqueness guaranteed in the communication device 101 may be used to generate a local domain name "key_id.local". In this way, there can be many variations. The local domain name is equivalent to an example of identification information of the first communication processor 112.

The setter 117 validates the local domain of the name generated by the second communication processor 115 through the first communicator 111 (step 5). Specifically, the setter 117 writes the generated local domain name ("localdomain") in the mDNS configuration file of the first storage 113 and causes the mDNS client of the first communicator 111 to read the setting. The mDNS client uses the mDNS to register the setting in the first network 501. Although this is a typical form of realization, the form is not limited to this. When the setting of the local domain is completed, the first communicator 111 transmits a setting completion notification of the local domain to the second communication processor 115 through the setter 117 (step 5f).

In response to an instruction from the second communication processor 115, the setter 117 further sets the origin information in the first communication processor 112, more specifically, sets the CORS (authorization of access from specific origin) (steps 6 and 6f). A difference from the first embodiment is that the server certificate is not generated yet at this stage, and the server certificate is not set. If the server function of the first communication processor 112 is not started, the setter 117 controls the first communication processor 112 to start the server function by requesting the first communication processor 112 to execute the start process.

The second communication processor 115 uses the key pair (public key and secret key) and the local domain name ("localdomain") and further uses the origin information ("origin") and the user information ("user_id") as necessary to generate a CSR (certificate signing request) (step 7). In FIG. 4, "csr" represents data of the generated CSR. The CSR includes, for example, the public key and the local domain name. The CSR may further include at least one of the origin information and the user information.

Since the device registration server 401 issues the server certificate in the present embodiment instead of the communication device 101, the CSR may include one or both the origin information ("origin") and the user information ("user_id") as attributes to be issued, for example. Additionally or alternatively, the CSR may include a random number, a serial, number, or a random character string.

In an example of X.509, a manufacturer name of the device 100 (or the communication device 101) or a web service name (origin information or host name included in the origin information) is set for an organization ("O=") that is a sub item of an attribute to be issued ("subject"). The local domain name ("localdomain") is set for a name to be issued ("CN=") that is also a sub item. The user information ("user_id") (for example, email address registered in the web service) is set for an email address ("email=") that is also a sub item.

As in step 15 of the first embodiment, the second communication processor 115 transmits, to the authorizer 118, a permission request for requesting the user authorization regarding the issue of the server certificate (or CSR) (step 8).

As in step 16 of the first embodiment, while the second communication processor 115 waits for a response from the authorizer 118, the second communication processor 115 uses the pre-shared key to sign the received challenge code ("code") to generate a signed code ("sign") (step 9).

In response to the permission request, the authorizer 118 displays an authorization dialog for asking the authorization of the user on the display of the device 100 (step 10). FIG. 5 shows an example of the authorization dialog. The example of FIG. 5 displays a dialog "TV remote control service is requesting access. The access involves issue of certificate of TV. Would you like to issue certificate? [Yes] [No]". A similar authorization dialog may also be displayed in the first embodiment.

When the user uses the remote control of the television to select "Yes" and presses an enter button 151, the authorizer 118 receives a signal indicating this and determines that the permission of the user is obtained (step 11). The authorizer 118 notifies, to the second communication processor 115, information indicating that the permission of the user is obtained (step 8f). The second communication processor 115 transmits the generated certificate signing request ("csr") and the signed code ("sign") to the web browser as a response to the CSR issue request of step 2 (step 2f). When, for example, the user authorization is not obtained within a timeout period, the authorizer 118 may return an error response. In this case, the second communication processor 115 may delete the issued certificate signing request. The second communication processor 115 may perform control such that the issued certificate signing request is not transmitted to the web browser. Therefore, the second communication processor 115 performs the control such that the server certificate is issued or used only when the authorization of the user is obtained. The order of steps can be changed to issue the certificate signing request after the user authorization.

The web browser checks the access (communication test) for the domain name ("localdomain") ("CN=") included in the certificate signing request ("csr") through the first network 501 (steps 12 and 12f). When the existence of the domain name ("localdomain") is confirmed, the web browser transmits the certificate signing request ("csr") and the singed code ("sign") as a success response for the CSR issue request (step 1) to the front end side (step 1f). Although the method of checking the access is executed as a web browser internal process here, the front end may check the access as in step 22 of the first embodiment.

The front end transmits the signed code ("sign") and the certificate signing request ("csr") to the back end (step 13). In this way, signature verification of the signed code and issue of the server certificate are requested.

The back end transmits, to the device registration server 401, a request for the signature verification of the signed code ("sign") and signing of the certificate signing request ("csr") (that is, issue of the server certificate) (step 14).

The device registration server 401 uses the pre-shared key to verify the signature of the signed code ("sign") (step 15).

If the device registration server 401 can confirm that the signed code ("sign") matches the data obtained by using the pre-shared key to sign the challenge code ("code"), that is, if the signature verification is successful, the device registration server 401 uses the secret key to sign the certificate signing request ("csr") (step 16). As a result, a server certificate ("cert") is issued. The secret key is a secret key that can be verified by the server certificate (public key) of the device registration server (in this case, the regular certification authority). The secret key corresponds to, for example, a fourth key. The server certificate includes, for example, content (such as the local domain name and the public key) of the certificate signing request and data (signature) obtained by using the secret key to sign the certificate signing request (or the hash value of the certificate signing request).

The front end receives the server certificate ("cert") from the device registration server 401 through the back end (steps 14f and 13f). The front end transmits a registration request (saving request) of the server certificate to the server certificate registration API provided on the web browser (step 17). The registration request includes the server certificate.

The web browser receives the registration request through the second network 601 and forwards the registration request to the second communication processor 115 (step 18).

The second communication processor 115 instructs the setter 117 to set, in the first communication processor 112, the server certificate ("cert") and a secret key ("secret") corresponding to the server certificate (step 19). The setter 117 sets the server certificate ("cert") and the secret key ("secret") in the first communication processor 112.

More specifically, the setter 117 acquires the secret key ("secret") cached in the second storage 116 or in a working memory of the second communication processor 115 and saves the secret key in a predetermined directory in the first storage 113. The setter 117 also saves the server certificate in the first storage 113. The setter 117 restarts the server function of the first communication processor 112 or controls the server function to reread the server certificate and the secret key.

In response to the success response from the second communication processor 115 (step 18f), the web browser saves the server certificate as a reliable server certificate in a storage area in the operation terminal 201 (step 20). The web browser transmits, to the front end, a response indicating the completion of the registration of the server certificate (step 17f).

The procedure allows issuing a regular server certificate that is signed by the regular certification authority (device registration server 401) and that can follow a change in the IP address of the communication device 101. Note that a plurality of different domain names according to origins of web servers (access sources) may be provided to the first communication processor 112 in the present embodiment. The setter 117 may put a restriction such that only one domain or a fixed number of domains are provided to the first communication processor 112. When a plurality of domain names can be provided, the first communication processor 112 includes a mechanism for properly using the server certificates according to the accessed domain names based on SNI (server name indication).

Figure 6:
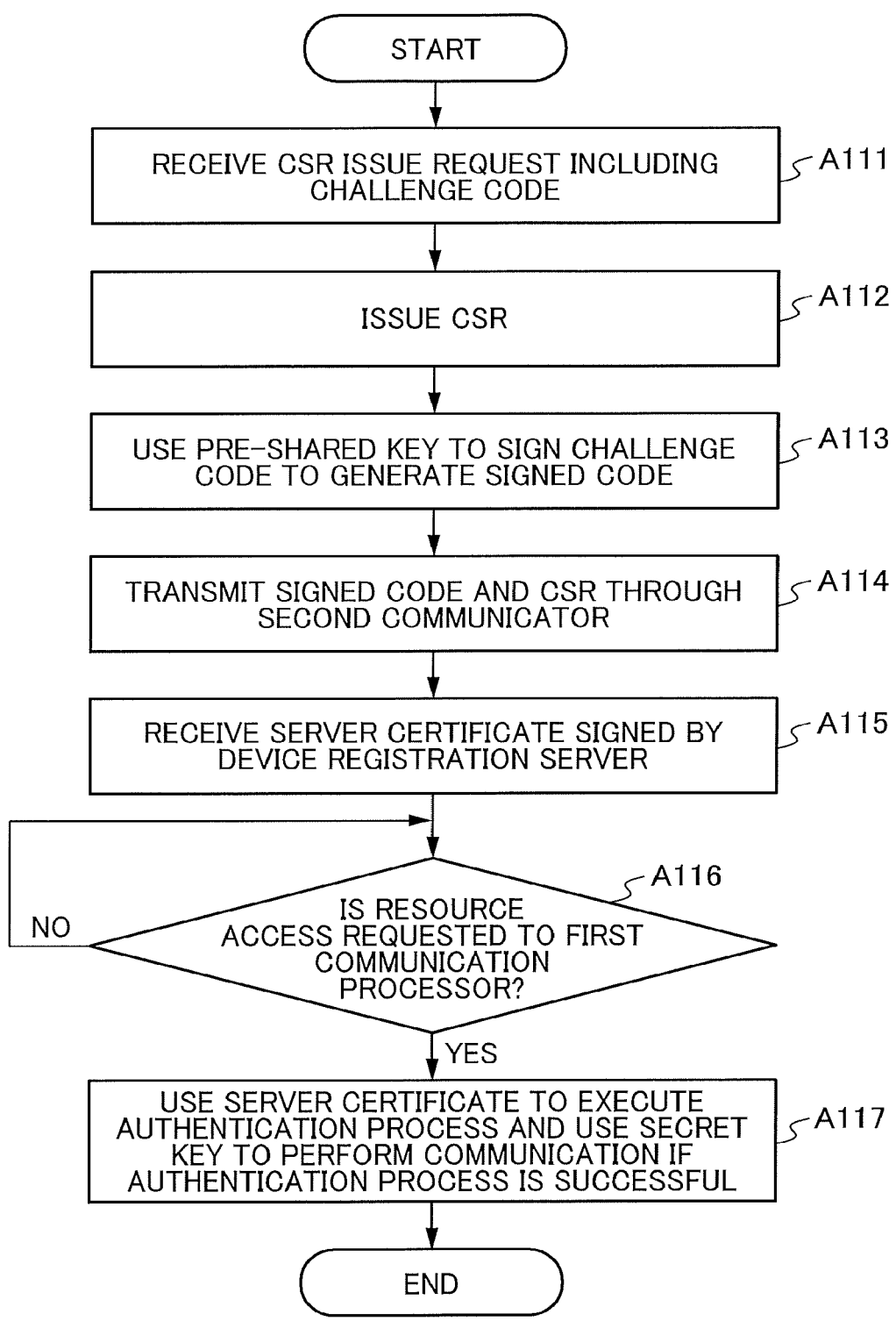
FIG. 6 is a flow chart of operation of the communication device according to the second embodiment.

FIG. 6 is a flow chart of operation of the communication device 101 according to the present embodiment. The second communication processor 115 receives the CSR issue request including the challenge code (data to be signed) through the second communicator 114 (step A111). The CSR issue request corresponds to, for example, a second mode of the issue request.

The second communication processor 115 generates a secret key and a public key and uses the identification information of the first communication processor 112, the public key, and the like to generate a CSR (certificate signing request) including the identification information of the first communication processor 112 and the public key (step A112).

The second communication processor 115 uses the pre-shared key to sign the challenge code to generate a signed code (signed data) (step A113). The pre-shared key held by the communication device 101 is equivalent to a third key, and the pre-shared key held by the device registration server 401 is equivalent to a seventh key, for example.

The second communication processor 115 transmits the signed code and the CSR through the second communicator 114 (step A114). The signed code and the CSR are transmitted to the device registration server 401 through the operation terminal 201 and the web server 301. The device registration server 401 verifies the signed code, and if the verification in successful, the device registration server 401 uses the secret key to sign the certificate signing request to issue a server certificate. The server certificate corresponds to, for example, a second certificate. The server certificate is transmitted to the web server 301. The web server 301 saves, in the web browser, the server certificate as a reliable server certificate. The web server 301 also transmits the server certificate to the second communication processor 115 through the operation terminal 201. The second communication processor 115 receives the server certificate (step A115) and sets the server certificate and the secret key in the first communication processor 112.

When the first communication processor 112 receives a command for requesting access to the resource (first process), such as remote control operation, through the first communicator 111, the first communication processor 112 uses the server certificate to execute an authentication process with the sender of the command (step A116). For example, the first communication processor 112 transmits the server certificate to the web browser or the web server 301, and if the certificate saved in the web browser or the web server 301 and the server certificate transmitted by the first communication processor 112 match, the authentication process is successful. If the authentication process is successful, the first communication processor 112 uses the secret key to communicate with the sender of the command to access the resource (same step A116).

According to the present embodiment, the communication device 101 issues the certificate signing request (CSR), and the CSR is signed by the certification authority to generate the server certificate. Therefore, the server certificate can be issued through the verification by the certification authority. In the first embodiment, the issued server certificate is a self-signed certificate issued by the own communication device 101, and the certification authority does not perform the verification. The present embodiment can realize the server certificate authenticated by the certification authority.

In the present embodiment, the server certificate is issued for the local domain name set in the first communication processor 112, and the server certificate can be continuously used even when the local IP address of the first communication processor 112 is changed.

<Third Embodiment>

In the first and second embodiments, the communication device 101 is mounted on a device including a physical interface (such as a screen of a television and a remote control) for checking the user's intention of authorization regarding the issue of the server certificate. The present embodiment illustrates a mode in which the communication device 101 is not provided with such as a physical interface.

Figure 7:
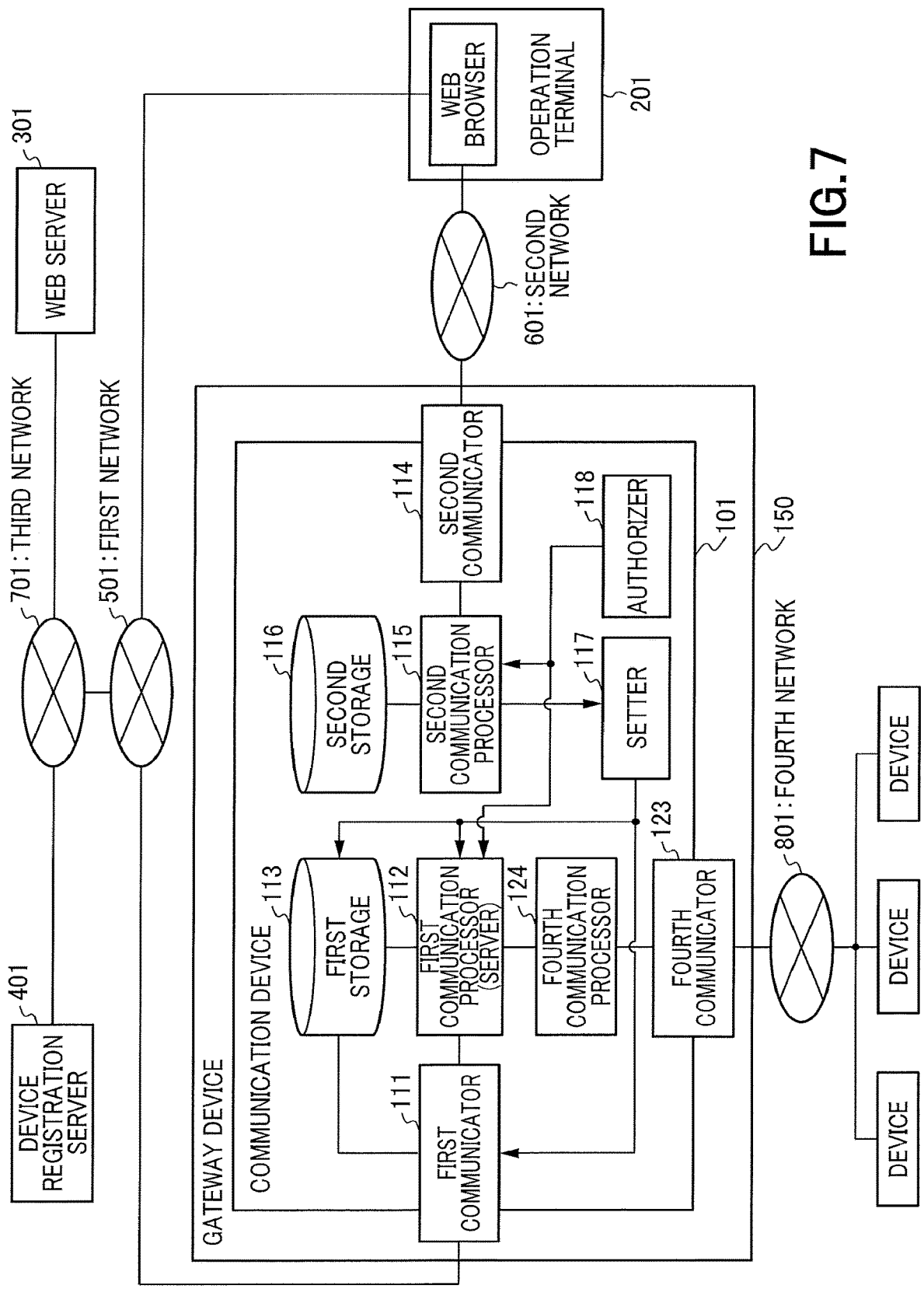
FIG. 7 is a diagram showing an overall configuration of a system including the communication device according to a third embodiment.

FIG. 7 shows an overall configuration of a system including the communication device 101 according to a third embodiment. Unlike in the first and second embodiments, the communication device 101 is mounted on a device without the physical interface, more specifically, on a home gateway device 150. In the home gateway device 150, a monitor and control function of home appliances is mounted on a broadband router.

Particularly, it is assumed in the present embodiment that the home gateway device 150 is a gateway device compliant with ECHONET that is a standard communication protocol related to HEMS (home energy management system), the gateway device configured to convert the protocol to allow monitoring and control corresponding to ECHONET from the first network 501 (such as a home network).

Differences from the first and second embodiments regarding the system configuration will be mainly described.

The gateway device 150 (more specifically, the communication device 101) is connected to one or a plurality of devices through a fourth network 801. Specifically, the fourth network 801 is a network compliant with ECHONET or SEP 2.0. The fourth network 801 may be a network compliant with other protocols such as Bluetooth and ZigBee. The fourth network 801 may be physically the same as the first network 501 or the second network 601.

The devices connected to the fourth network 801 are devices monitored and controlled through the gateway device 150. It is assumed in the present embodiment that the devices on the fourth network 801 are devices corresponding to ECHONET. It is assumed in the present embodiment that one of the devices on the fourth network 801 is a smart meter.

The communication device 101 includes a fourth communicator 123 and a fourth communication processor 124 in addition to the blocks included in the communication device of the first or second embodiment, and functions of the authorizer 118 and the like are extended or changed.

The fourth communicator 123 communicates with the devices on the fourth network 801 to be controlled. A physical medium may be common to the first communicator 111 and the second communicator 114. It is assumed here that the fourth communicator 123 has a communication module function including protocols of upper layers of the physical medium, specifically, from the MAC layer to the ECHONET protocol. The fourth communicator 123 is formed by, for example, a communication circuit. The communication circuit may be formed by only hardware or may be formed by hardware and software.

The fourth communication processor 124 converts the protocol between the operation terminal 201 on the first network 501 and the devices on the fourth network 801. In the present embodiment, the fourth communication processor 124 converts the protocol between HTTP and ECHONET.

The authorizer 118 receives a user authorization request (hereinafter, called "authorization request") from the operation terminal 201 through the first communication processor 112 and controls the operation terminal 201 to display an authorization screen for authorization (or rejection) by the user. It is assumed that the authorizer 118 uses CAPTCHA (mechanism in which the user is asked to input the same characters as image data of characters displayed on the screen to prevent automatic operation by the machine) or the like to provide a mechanism that guarantees involvement of user operation. The user performs authorization (or rejection) on the authorization screen, and the input information is transmitted to the operation terminal 201. When the authorization of the user is obtained, the operation terminal 201 notifies the fact to the authorizer 118.

The authorizer 118 transmits a session ID, for which the user authorization is obtained, to the second communication processor 115 in order to link the authorization request received through the first communication processor 112 and the authorization performed by the user on the authorization screen. As a result, the second communication processor 115 can perform user authentication involving the session ID.

Figure 8:
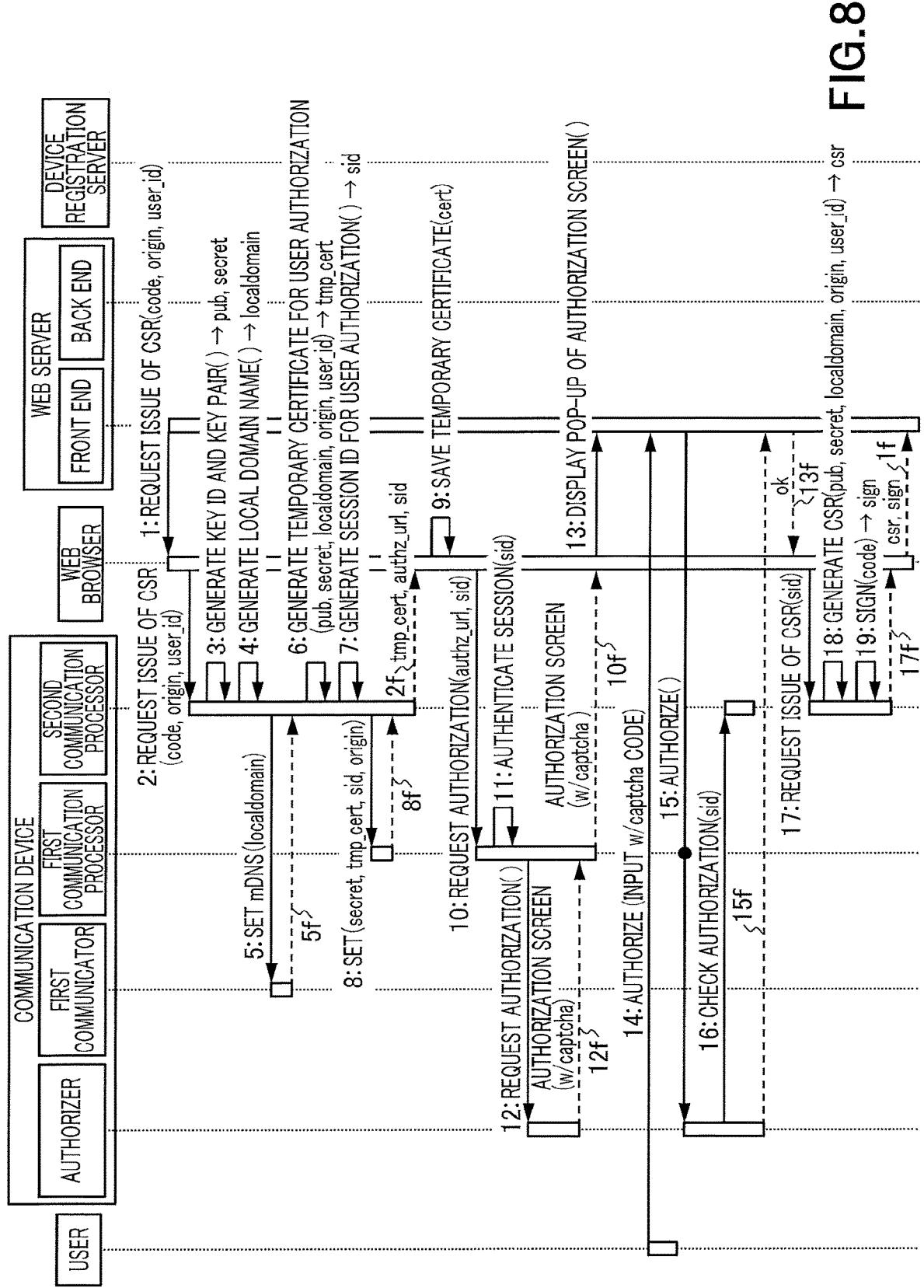
FIG. 8 is a diagram showing a communication sequence of the system according to the third embodiment.

FIG. 8 shows a communication sequence of the system according to the third embodiment. The present sequence illustrates a user scenario in which the user displays a web screen of a cloud HEMS service on the web browser of the operation terminal 201, and an integrated value of power consumption of the device (smart meter here) on the fourth network 801 is acquired through the gateway device 150.

Although steps 1 to 8*f* (up to the issue of the challenge code) of the sequence (FIG. 2) of the first embodiment are performed before the start of the sequence of FIG. 8, steps 1 to 8*f* are not illustrated. Although the processes from step 13 (processes regarding signature verification and certificate issuance) of the sequence (FIG. 4) of the second embodiment are performed after the sequence of FIG. 8, the processes are not illustrated.

Steps 1 to 5*f* of FIG. 8 are the same as steps 1 to 5*f* of the sequence (FIG. 4) of the second embodiment, and the description will not be repeated.

The second communication processor 115 generates a temporary self-signed server certificate ("tmp_cert") to display the authorization screen to the user (step 6). A short effective period, such as 30 seconds, is set for the certificate. All or part of the key pair ("pub" and "secret"), the local domain name ("localdomain"), the origin information ("origin"), and the user information ("user_info") can be used to generate the self-signed server certificate ("tmp_cert"). The public key ("pub") of the key pair corresponds to a fifth key, and the secret key ("secret") corresponds to a sixth key.

The second communication processor 115 generates a session ID ("sid") for associating the access to the authorization screen from the operation terminal 201 described later and the CSR issue request of step 1 (step 7).

The second communication processor 115 sets the secret key, the self-signed server certificate ("tmp_cert"), the session ID ("sid"), and the origin information in the first communication processor 112 through the setter 117 (steps 8 and 8*f*).

The second communication processor 115 temporarily starts the first communication processor 112 to execute the authorization process (temporarily authorizes access from the origin information ("origin")) and returns the self-signed server certificate ("tmp_cert") and the session ID ("sid") to the web browser (step 2*f*). In this case, the second communication processor 115 may also return the URL ("authz_url") of the authorization screen. Alternatively, a fixed value may be defined in advance for a relative path of the authorization screen, and the authorization screen URL may be derived on the web browser from only the domain information included in the self-signed server certificate. In this case, the second communication processor 115 may not return the URL ("authz_url") of the authorization screen.

The web browser saves the self-signed server certificate ("tmp_cert") as a reliable certificate in an accessible area in the operation terminal 201 (step 9).

The web browser transmits a request for the authorization screen to the first communication processor 112 (HTTPS server) through the first network 501 (step 10). The request includes the URL ("authz_url") of the authorization screen and the session ID ("sid"). Before the transmission of the request for the permission screen, the web browser uses the self-signed server certificate ("tmp_cert") to perform authentication with the first communication processor 112. If the self-signed server certificate possessed by the web browser matches the self-signed server certificate held by the first communication processor 112 (if the self-signed server certificate is registered as a reliable server certificate), the web browser determines that the authentication is successful.

The first communication processor 112 checks the session ID ("sid") (step 11).

If the session ID set in step 8 and the received session ID match, the first communication processor 112 determines that the authentication of the session ID ("sid") is successful, and the first communication processor 112 returns the authorization screen to the web browser through the authorizer 118 (steps 12, 12*f*, and 10*f*). Therefore, the first communication processor 112 transmits an authorization request including the session ID to the authorizer 118 (step 12), receives an authorization screen as a response from the authorizer 118 (step 12*f*), and transmits the authorization screen to the web browser (step 10*f*).

The web browser transmits a request for pop-up display of the authorization screen to the front end. The request may include the session ID (step 13). The front end controls the web browser of the operation terminal 201 to display the pop-up of the authorization screen.

Figure 9:
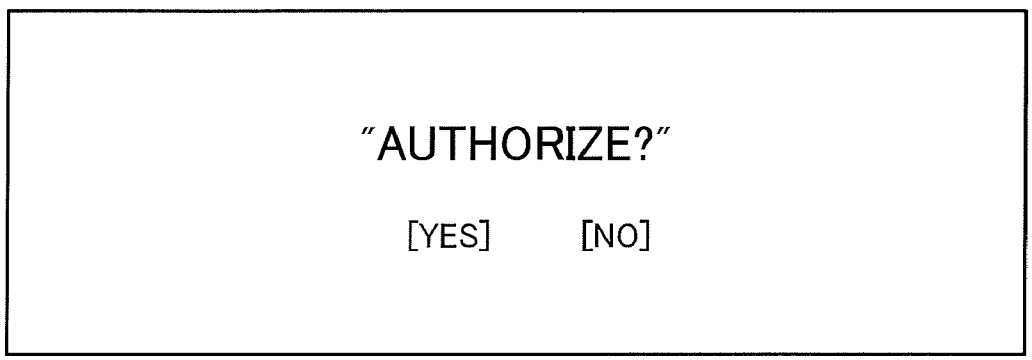
FIG. 9 is a diagram showing an example of an authorization screen displayed on a web browser of an operation terminal.

FIG. 9 shows an example of the authorization screen displayed on the web browser of the operation terminal 201. The screen displays a dialog "Authorize? [Yes] [No]". In this case, an image for CAPTCHA may also be displayed to ask the user to input a code corresponding to the image to guarantee the involvement of the user.

When the user authorizes the access, the user inputs the code corresponding to the image for CAPTCHA and presses a "[Yes] button" (step 14). Note that the display of the image for CAPTCHA and the input field is not illustrated in FIG. 9. A method other than the CAPTCHA may be used as means for guaranteeing the involvement of the user.

The front end or the web browser transmits a notification indicating the acquisition of the user authorization to the authorizer 118 (step 15). The notification may include the session ID. The authorizer 118 transmits, to the second communication processor 115, a notification indicating the acquisition of the authorization from the user corresponding to the session ID ("sid") (step 16). The authorizer 118 also returns, to the front end, completion of the notification to the second communication processor 115 (step 15*f*).

The front end notifies the success of the authorization process by the user to the web browser (step 13*f*), and the web browser transmits a CSR issue request again to the second communication processor 115 (step 17). The CSR issue request includes the session ID ("sid").

The second communication processor 115 generates a certificate signing request ("CSR") (step 18) in response to the CSR issue request when the notification indicating the acquisition of the user authorization is received in advance from the authorizer 118 (see step 16). The certificate signing request (CSR) may be the same as in the second embodiment.

The second communication processor 115 uses the pre-shared key to sign the challenge code ("code") to generate a signed code ("sign") (step 19).

The second communication processor 115 returns the certificate signing request ("csr") and the signed code ("sign") to the web browser (step 17*f*). The web browser transmits the certificate signing request ("csr") and the signed code ("sign") as a response to the CSR issue request of step 1 (step 1*f*). Steps after this are the same as step 13 and subsequent steps of FIG. 4 in the second embodiment as described above.

The procedure can issue a regular server certificate that is provided with the signature of the regular certification authority (device registration server 401) and that can follow a change in the IP address of the communication device 101 even when the communication device 101 is mounted on a device without the user interface for the user to express the intention of authorization.

Although the procedure is based on the sequence of the second embodiment (sequence when the CSR issue request is received), the procedure can be similarly carried out in the sequence of the first embodiment (sequence when the certificate issue request is received).

Figure 10:
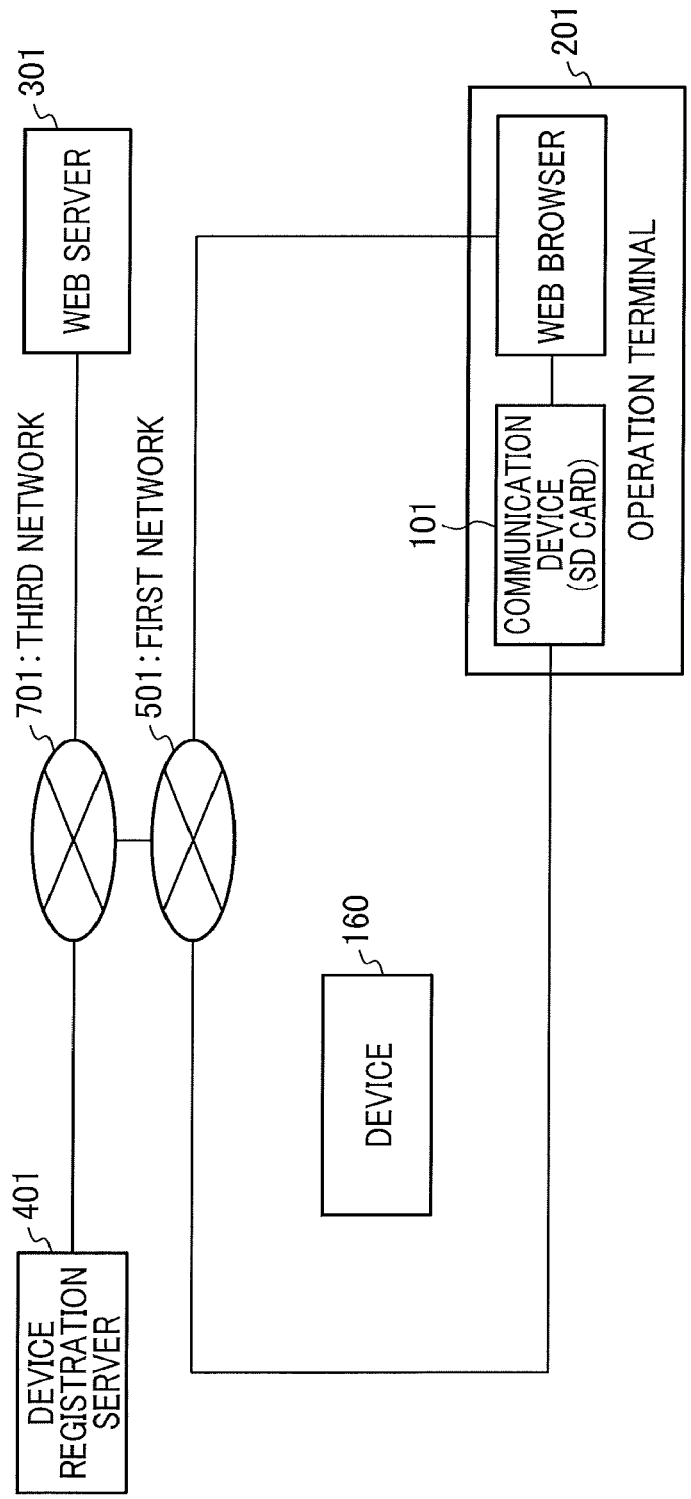
FIG. 10 is a diagram showing a state in which an SD card provided with the communication device is inserted into the operation terminal.
Figure 11:
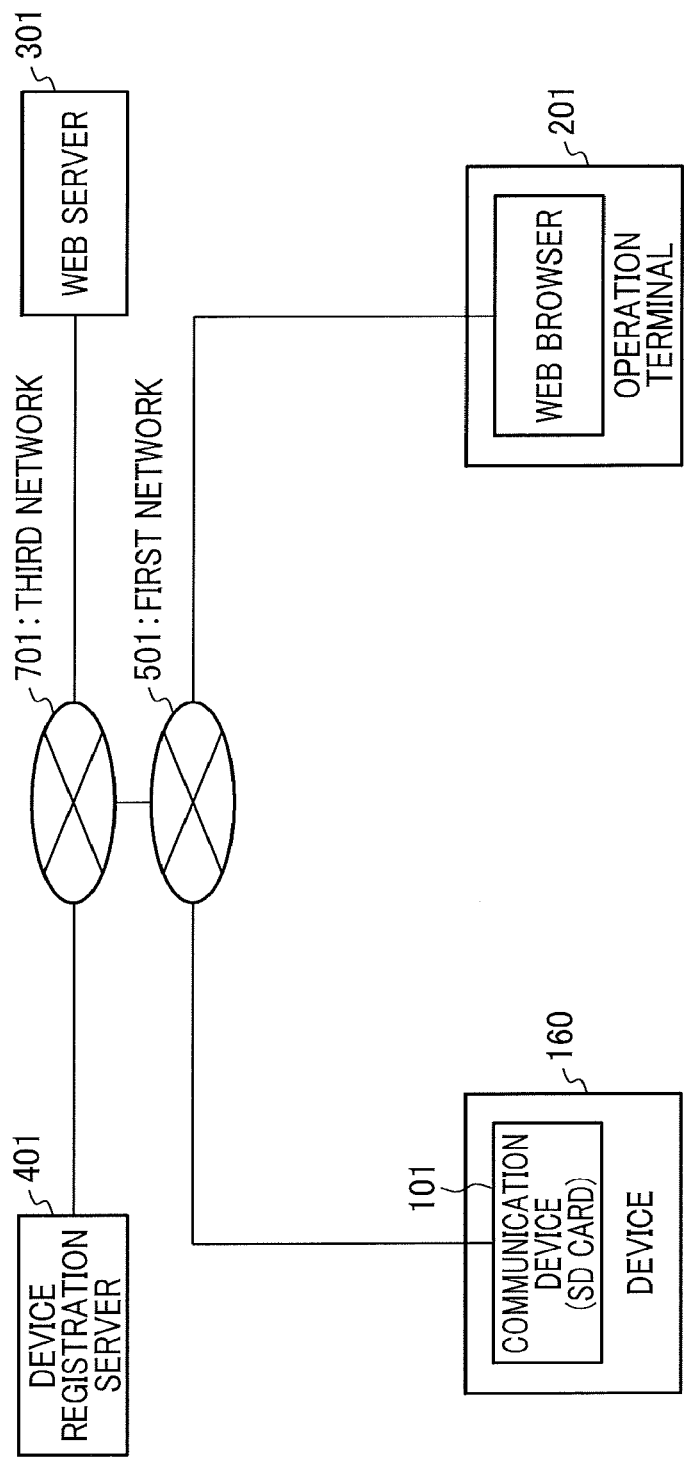
FIG. 11 is a diagram showing a state in which the SD card is extracted from the operation terminal and inserted into a legacy device.

Other than the gateway device, various applications can be considered for the device provided with the communication device 101 according to the present embodiment. An example of the device other than the gateway device includes an SD card having a Wi-Fi function. In this case, the first network and the first communicator 111 correspond to Wi-Fi, and the second network and the second communicator 114 correspond to SDIO, for example. An application scenario will be described in which the SD card with a Wi-Fi function is inserted into a legacy device without a communication function to put the legacy device into IoT. FIGS. 10 and 11 are diagrams for describing the scenario.

As shown in FIG. 10, the user inserts the SD card provided with the communication device 101 according to the present embodiment into the operation terminal 201. A legacy device 160 without a communication function is arranged in the house of the user. The operation terminal 201 is, for example, a PC (personal computer) such as a notebook PC.

The user logs in to an IoT (Internet of Things) service of the device corresponding to the SD card by operating the web browser on the operation terminal 201 into which the SD card is inserted. The IoT service corresponds to the web service provided by the web server 301.

A server certificate for the SD card is generated based on the communication sequence (FIG. 8) of the present embodiment, and the server certificate is saved in the SD card. In this case, data of logic (such as CGI) for controlling, via the first communication processor 112 (HTTP server), the device (legacy device 160) to be controlled through the SD card is also set in the SD card. The logic is a program operated on the HTTP server. The logic may be provided from the web server 301 or may be installed in advance on the operation terminal 201.

Subsequently, as shown in FIG. 11, the user extracts the SD card from the operation terminal 201 and inserts the SD card into the legacy device 160 to put the legacy device 160 into the IoT. Therefore, the legacy device 160 can be controlled through the first network 501. Subsequently, the cross-origin access is conducted from the web browser of the operation terminal 201 to the IoT device through the web server 301. In this case, the CORS can be set to control and allow the access only from the front end of the web server 301. The logic, such as CGI, operated on the HTTP server of the first communication processor 112 in the SD card controls the legacy device 160 through the second communicator 114 (SDIO). As a result, the operation terminal 201 can control the IoT legacy device 160, and the legacy device 160 can acquire the data saved in the SD card. Although the second communicator 114 is the SDIO in the scenario, the second communication 114 may be Wi-Fi just like the first communicator 111. Specifically, the Wi-Fi function of the SD card may have both an access point function and a station function. The second communicator 114 may be on the access point function side, and the first communicator 111 may be on the station function side. In this case, the setter 117 may be configured to also control the operation mode of Wi-Fi to operate the access point function until the issue of the certificate and operate the station mode function after the issue of the certificate.

<Fourth Embodiment>

In the first to third embodiments, the server certificate is issued to allow the web service to determine the legitimacy of the communication device 101 or the device (or the gateway device). In the present embodiment, a client certificate is issued to the web service to allow the device side to verify the validity of the web service. Frankly, the device side has functions corresponding to the role of the device registration service of the first to third embodiments to verify the validity of the web service.

The system configuration of the present embodiment is the same as in FIG. 7 according to the third embodiment. However, part of the functions of the communication device 101 are changed or extended.

The difference from the third embodiment is that the second communication processor 115 has a challenge code ("code") issue function, a signature verification function, and a client certificate issue function.

Figure 12:
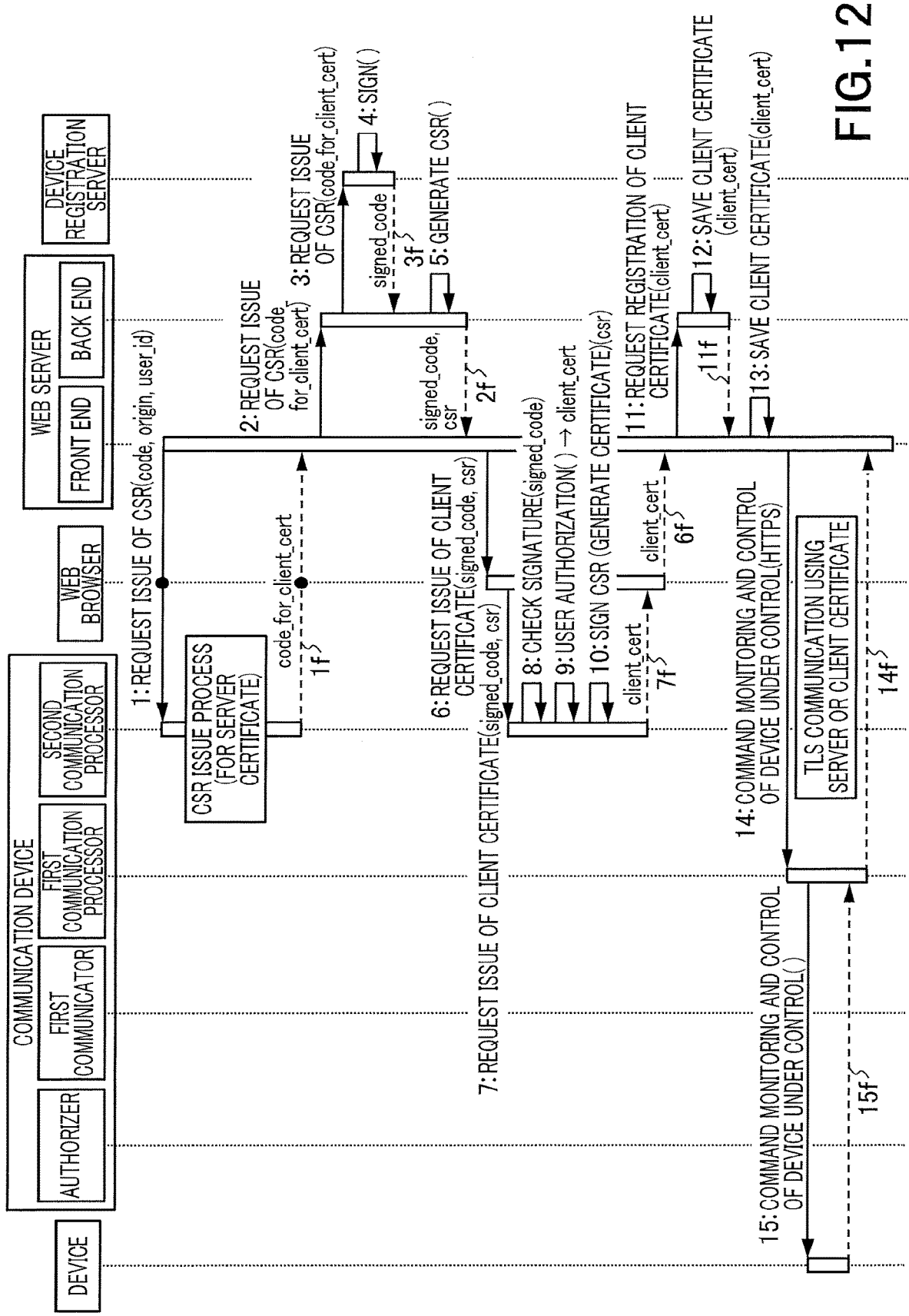
FIG. 12 is a diagram showing a communication sequence of a system according to a fourth embodiment.

FIG. 12 shows a communication sequence of the system according to a fourth embodiment. The user scenario is the same as in the third embodiment, in which the user displays the web screen of the cloud HEMS service on the web browser of the operation terminal 201, and the integrated value of the power consumption of the device (smart meter here) on the fourth network 801 is acquired through the gateway device (device) 150.

The second communication processor 115 receives a CSR issue request for the first communication processor 112 (HTTP server) of the communication device 101 from the front end through the web browser (step 1). The second communication processor 115 issues a challenge code ("code_for_client_cert") in response to the CSR issue request and transmits the challenge code to the front end (step 1f). At this time, the second communication processor 115 may execute step 2 and subsequent steps of FIG. 8 (CSR issue process for server certificate) in response to the reception of the CSR issue request, and the response in step 1f of FIG. 12 may also serve as the response in step 1f of FIG. 8. In this case, the sequences may be separately executed for the responses in the subsequent operation. Alternatively, the process after step 1f of FIG. 8 may be executed first, and the process after step 1f of FIG. 12 (sequence after the return of the challenge code) may be started after the completion of the setting of the server certificate.

In another method, the second communication processor 115 may include a challenge code request interface for issuing the client certificate. In this case, the second communication processor 115 may receive the challenge code issue request from the front end through the web browser and return the challenge code ("code_for_client_cert").

The front end of the web service transmits the acquired challenge code ("code_for_client_cert") to the back end (step 2).

The back end transmits the challenge code ("code_for_client_cert") to the device registration server 401 as an argument of the CSR issue request (step 3).

The device registration server 401 uses the pre-shared key to sign the challenge code ("code_for_client_cert") (step 4) and returns a signed code ("signed_code") that is the signed challenge code to the back end (step 3f).

The back end generates a key pair (secret key and public key) (step 5). The back end holds the secret key inside and generates a certificate signing request (CSR) including the identification information of the web service, the public key, and the like (same step 5). The back end returns the signed code ("signed_code") and the certificate signing request (CSR) to the front end (step 2f).

The front end transmits, to the web browser, a client certificate issue request including the signed code ("signed_code") and the certificate signing request as arguments (step 6).

The web browser forwards the client certificate issue request to the second communication processor 115 (step 7).

The second communication processor 115 uses the pre-shared key to verify the signed code ("signed_code") included in the received client certificate issue request (step 8). If the verification has failed, the second communication processor 115 returns an error response.

If the verification is successful, the second communication processor 115 executes an authorization process for asking the user to issue the client certificate (step 9). The authorization process is the same as in the first to third embodiments, and the detailed description will not be repeated.

The second communication processor 115 uses the secret key of the server certificate to sign the certificate signing request (CSR) to issue a client certificate ("client_cert") (step 10). The second communication processor 115 transmits the client certificate ("client_cert") to the web browser (step 7f). The secret key used here is a secret key of the server certificate corresponding to the origin information (web service) indicating the requester of the client certificate issue request and corresponding to the user.

The web browser forwards the received client certificate ("client_cert") to the front end (step 6f).

The front end generates a client certificate registration request including the received client certificate and transmits the client certificate registration request to the back end (step 11).

The back end generates a file including the received client certificate and the secret key generated and saved in step 5 (step 12) and transmits the file to the front end (step 11f).

The front end saves (installs) the received file (generally called "p12 file") in the web browser (step 13). In this case, an installation dialog may be displayed on the screen of the web browser to explicitly ask the user to install the file.

The front end receives a request for the resource access (request for monitoring or control) from the user through the web browser. The front end uses the HTTPS protocol to issue a command for monitoring or controlling the device under the control of the gateway device 150 and transmits the command to the first communication processor 112 (step 14). In this case, mutual authentication based on the client certificate and the server certificate is performed when TLS connection of a lower layer is established. The authentication based on the client certificate can be performed as follows, for example. The first communication processor 112 receives the client certificate from the front end or the web browser. The first communication processor 112 uses the secret key of the server certificate to decode the signature of the received client certificate and determines that the client certificate is reliable if the decoded data matches the body part (part equivalent to CSR) other than the signature of the client certificate or the hash value of the body part. Although the communication after the authentication can be encrypted by using the secret key and the public key of the server certificate, the communication can also be encrypted by using the secret key and the public key of the client certificate.

The fourth communication processor 124 converts the protocol of the command and transmits the converted command to the device under the control of the gateway device 150. As a result, the device is monitored and controlled (steps 15 and 15f). The first communication processor 112 feeds back results of monitoring and control to the front end (step 14f).

According to the procedure, the local server (first communication processor 112) on the communication device 101 can use the client certificate to verify the access source (web service and user). In this case, the client certificate can be issued to the web service (regular web service) that can be signed by the device registration server 401 under the authorization of the user who can access the local server.

Note that the user authorization may be performed all at once when the server certificate and the client certificate are issued in a series of processes. For example, step 9 of FIG. 12 may be skipped if the authorization of the user is already obtained at the generation of the server certificate.

<Fifth Embodiment>

Although the communication device 101 can verify the access source (web service and user) based on the client certificate in the fourth embodiment, the installation and the update of the client certificate are time-consuming. The present embodiment solves the problem by integrating the authentication of the access source performed by the first communication processor 112 on the communication device 101 with the user authentication of the web service (i.e., the communication device 101 transfers the user authentication to the web service).

The system configuration of the present embodiment is the same as in FIG. 7 according to the third embodiment. However, part of the functions of the communication device 101 is changed or extended.

In addition to the HTTP server function of the first to third embodiments, the first communication processor 112 has a client registration function, an authorization transfer function, a token verification function, and a user information acquisition function.

Figure 13:
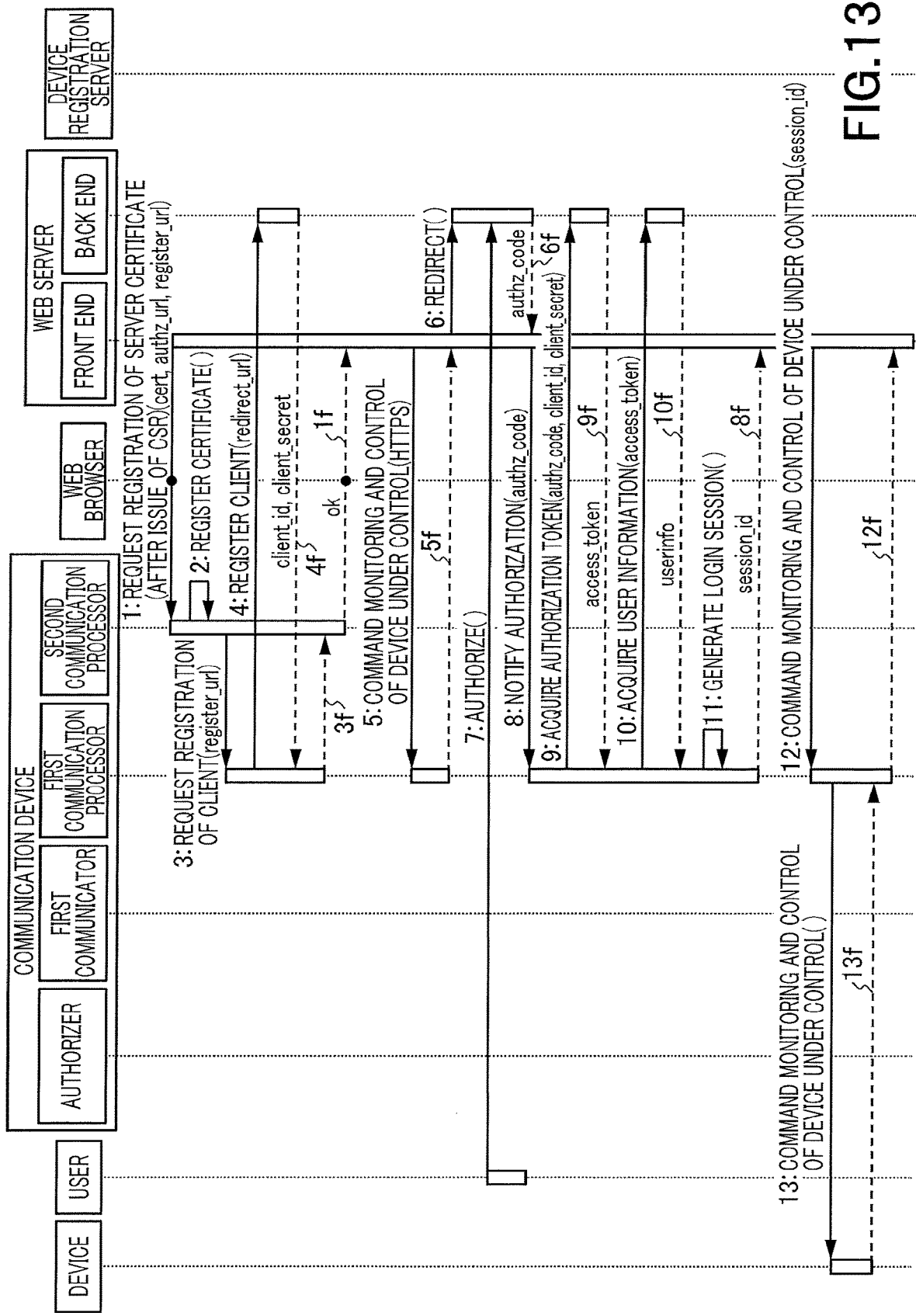
FIG. 13 is a diagram showing a communication sequence of a system according to a fifth embodiment.

FIG. 13 shows a communication sequence of the system according to a fifth embodiment. FIG. 13 shows a sequence from the moment of the issue of the server certificate in the third embodiment. Before this, the same sequence as in the third embodiment (i.e., steps 1 to 8 of FIG. 2, followed by the sequence of FIG. 8, and subsequent steps 13 to 13f of FIG. 4) is performed. The user scenario is the same as in the third embodiment.

It is assumed that the web server has an authorization server function of protocols OpenID Connect and OAuth 2.0 for transferring the access right on the web.

The second communication processor 115 receives, through the web browser, a registration request of the server certificate ("cert") generated by the signature of the device registration server 401 (step 1).

The registration request includes the server certificate and further includes information of a client registration URL ("register_url") for the web service and an authorization screen URL ("authz_url") as parameters.

The client is the first communication processor 112 (HTTP server). Therefore, the first communication processor 112 is the RP (relying party) for transferring the authentication to the web service. Alternatively, a path to a file with a list of URL information on the web service side may be provided instead of the individual URLs. A specific method of realization can be any method.

The second communication processor 115 registers the server certificate in the first communication processor 112 (step 2).

The second communication processor 115 transmits a client registration request for instructing to register the client in the web service to the first communication processor 112 through the setter 117 (step 3). The client registration request includes a client registration URL ("register_url"). The client registration URL is a URL used to register, in the web server 301, the client that is the first communication processor 112 (HTTP). The URL is a path in the web service provided by the web server 301.

The client registration function of the first communication processor 112 transmits a client registration request to the back end of the web server 301 through the first network 501 (step 4). The client registration request includes at least a path ("redirect_url") of the screen for redirection after the completion of the authentication by the user described later. Instead of the direct communication with the web server 301, the first communication processor 112 may communicate with the web server 301 through the second communication processor 115 and the web browser (the same applies to the following).

When the client registration request is received, the back end issues a client ID ("client_id") and a secret key ("client_secret") to register the client. The back end returns and transmits the client ID ("client_id") and the secret key ("client_secret") to the first communication processor 112 (step 4f). Note that a configuration without the issue and the transmission of the secret key ("client_secret") is also possible.

The client registration function of the first communication processor 112 returns, to the second communication processor 115, a notification indicating the completion of the registration of the client (step 3f), and in response to this, the second communication processor 115 returns a notification indicating the completion of the registration of the server certificate (step 1f).

The first communication processor 112 receives a command for requesting the resource access, that is, a monitoring and control command of the device, from the front end through the first network 501 (step 5). At this point, the front end is not permitted to access the first communication processor 112 yet. In this case, the authorization transfer function of the first communication processor 112 returns a redirect instruction for the authorization screen URL ("authz_url") to the front end (step 5f). The authorization screen URL is a URL used for presenting a screen for executing the user authorization process. The URL is a path in the web service. The front end is redirected to the authorization screen URL ("authz_url") included in the received redirect instruction (step 6).

The user may execute a login process as necessary in the redirected screen on the web service (screen of the web browser). The user authorizes the client (first communication processor 112) to provide a right of access to the resources (such as user information) on the web service through the screen (step 7). The client also designates information indicating a range of the requested right at the registration of the client (step 4). The web browser transmits a notification indicating the permission of the user to the back end through the front end (same step 7).

After the authorization by the user, the back end generates an authorization code ("authz_code") as authorization data indicating the authorization of the user and transmits, to the front end, "redirect_url" acquired in step 4 after adding the authorization code (step 6f). The front end is redirected to the first communication processor 112 according to "redirect_url", and the front end transmits an authorized notification including the authorization code to the first communication processor 112 through the first network 501 (step 8). In this way, the back end redirects the front end from "redirect_url" to the first communication processor 112 to transmit the authorization code ("authz_code") to the first communication processor 112.

The token acquisition function of the first communication processor 112 generates an authorization token acquisition request including the acquired authorization code ("authz_code"), the client ID ("client_id"), and the secret key ("client_secret"). The authorization token acquisition request is equivalent to an acquisition request of user information. The first communication processor 112 (token acquisition function of the first communication processor 112) transmits the request to the back end through the front end (step 9).

When the back end receives the authorization token acquisition request, the back end generates an access token ("access_token") and returns the access token to the first communication processor 112 through the front end (step 9f). The access token is permission information indicating permission for the authorization token acquisition request. The access token is, for example, an arbitrary character string, and the method of generating the access token can be arbitrary.

The user information acquisition function of the first communication processor 112 generates a user information acquisition request including the acquired access token ("access_token") and transmits the request to the back end through the front end (step 10). The user information requested by the user information acquisition request is not restricted to the attribute information of the user, and the user information indicates information and functions in general that can be accessed with the authority of the user. The back end verifies the access token to specify the user information corresponding to the access token and transmits the user information to the first communication processor 112 (step 10*f*). In FIG. 13, "userinfo" represents the user information. The access token in this case may be provided with signature information for verifying the issuer (web server 301) and the receiver (first communication processor 112). For the signature, the secret key of the web server 301 can be used to verity the issuer, and the "client_secret" can be used to verify the receiver, for example. In this way, the web server 301 may be able to verify that the token is issued to the first communication processor 112 by the web server 301.

If the acquisition of the user information is successful, the first communication processor 112 generates a login session ID ("session_id") (step 11) and transmits a response including the login session ID ("session_id") to the front end (step 8*f*). The login session ID ("session_id") is generally set in Set-Cookie of HTTP. The success in the acquisition of the user information denotes that the first communication processor 112 can determine that the web server 301 is legitimate.

The front end transmits a monitoring and control command of the device including the login session ID ("session_id") to the first communication processor 112 through the first network 501 (step 12).

The first communication processor 112 determines to authorize the access by the front end through authentication based on Cookie. The first communication processor 112 transmits the monitoring and control command received from the front end to the device under control (step 13). The first communication processor 112 receives an execution completion notification of the command from the device (step 13*f*) and transmits the execution completion notification of the command to the front end (step 12*f*).

The procedure allows the user authentication performed on the web service side to substitute for the verification of the access source that should be performed by the first communication processor 112 that is a local server in the communication device 101. The present embodiment can integrate the authentication that should be performed by the communication device 101, with the authentication mechanism on the origin authorized to access the device provided with the communication device 101. The authentication based on the server certificate can be executed as in the first to fourth embodiments.

Although the procedure is based on the sequence of the second embodiment (sequence when the CSR issue request is received), the procedure can be similarly carried out in the sequence of the first embodiment (sequence when the certificate issue request is received).

Although the communication device 101 is mounted on the gateway device in the example illustrated in the present embodiment, the communication device 101 may be mounted on, for example, a local cache device for content distribution service (web service). The local cache device can be accessed from only a web screen of the content distribution service, and the present embodiment can integrate the authentication performed on the local cache device side with the content distribution service. Therefore, only the user with a correct right to view can locally cache the purchased content or the content added to the watch list, and there is an advantage, such as the content can be viewed just by local communication (download from the Internet is not necessary to view the content).

The communication device, the operating terminal, the Web server or the device registration server in each embodiment may also be realized using a general-purpose computer device as basic hardware. That is, each function provided in the communication device, the operating terminal, the Web server or the device registration server can be realized by causing a processor mounted in the above described computer device to execute a program. In this case, the communication device, the operating terminal, the Web server or the device registration server may be realized by installing the above described program in the computer device beforehand or may be realized by storing the program in a storage medium such as a CD-ROM or distributing the above described program over a network and installing this program in the computer device as appropriate. Furthermore, the storages provided in the communication device, the operating terminal, the Web server or the device registration server may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

The term "storage" may encompass any device which can permanently memorize data by magnetic technology, optical technology or non-volatile memory. For example, the storage may be an HDD, an optical disc, an SDD or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device for providing a resource of a first device to a user, comprising:
   a first communicator capable of communicating with a first server through a first network;
   a second communicator capable of communicating with an operation terminal of the user through a second network, wherein the operation terminal is able to communicate with the first server through the first network;
   a first communication processor configured to execute an authentication process for the operation terminal via the first communicator and the first server and execute a first process for providing the resource of the first device to the user via the first communicator if the authentication process is successful; and
   a second communication processor configured to
      receive an issue request of a certificate from the first server via the second communicator and the operation terminal,
      issue a certificate signed by a second key of a key pair including a first key and the second key, wherein the certificate issued includes identification information of the first communication processor and the first key, the identification information is included in the certification for a subject attribute of the certificate, and the certificate is provided to the first communication processor,
      configured to sign a target data by a third key to generate signed data, the target data being included in the issue request or previously shared between the communication device and a second server, the second server being capable of communicating with the first server, and
      configured to transmit the signed data and the certificate to the first server through the second communicator and the operation terminal, wherein the certificate is installed in the operation terminal by the first server after the signed data is verified by the second server; and
   an authorizing processor configured to present information inquiring whether issuance of the certificate is permitted to the user and acquire information indicating whether issuance of the certificate was permitted,
   wherein the first communication processor executes the authentication process with the operation terminal, via the first communicator and the first server, based on the certificate if the first communication processer receives a command of execution of the first process from the operation terminal via the first server and the first communicator, and
   wherein the second communication processor issues the certification only when the acquired information indicates that the user permitted the issuance of the certification or the second processor controls that the first communication processor executes the authentication process only when the acquired information indicates that the user has permitted the issuance of the certification.

2. The communication device according to claim 1, wherein
   the second communication processor generates a certificate signing request instead of issuing the certificate, wherein the certificate signing request includes: the identification information of the first communication processor for the subject of issuance of the certification and the first key;
   the second communication processor transmits the certificate signing request and the signed target data via the second communicator, the operating terminal, and the first server,
   the second communication processor receives a second certificate resulting from the certificate signing request is signed by a fourth key in the second server from the second server via the first server, the operation terminal, and the second communicator,
   the authorizing processor presents information inquiring whether issuance of the certificate signing request or the second certificate is permitted to the user,
   the second communication processor generates the certificate signing request only when the user has permitted to issue the certificate signing request or the second certificate, and
   the first communication processor executes the authentication process based on the second certificate if the first communication processor receives the command of execution of the first process.

3. The communication device according to claim 1, wherein
   the issue request includes identification information of a source of the issue request, the source being the first server,
   the certificate includes a plurality of attributes, and at least one of the plurality of attributes includes identification information of a source of the issue request, the source being the first server.

4. The communication device according to claim 1, wherein
   the issue request includes identification information of the user, and
   the certificate includes a plurality of attributes, and at least one of the plurality of attributes includes the identification information of the user.

5. The communication device according to claim 1, wherein
   the authorizing processor acquires the information through a physical interface of the first device in which the communication device is provided.

6. The communication device according to claim 1, wherein
   the second communication processor issues a third certificate based on a fifth key, a sixth key paired with the fifth key, and the identification information of the first communication processor in response to the reception of the issue request, wherein the third certificate is a temporary certification required for displaying a screen for the user, the user being capable of presenting permission or non-permission via the screen,
   the second communication processor transmits the third certificate to the operation terminal through the second communicator,
   the first communicator is able to communicate with the operation terminal through the first network,
   the first communication processor performs authentication with the operation terminal based on the third certificate via the first communicator, and
   the authorizing processor controls to display the screen for the user after the authentication is successful based on the third certificate, and acquires the information through input to the screen by the user.

7. The communication device according to claim 1, wherein the second communication processor transmits a second target data to the first server via the second communicator and the operation terminal, the second communication processor receives a second certificate signing request, identification information of the first server and a public key generated by the first server from the first server via the second communicator, wherein the second certificate signing request includes second signed data resulting from that the second target data is signed by a seventh key, the seventh key being a shared key between the communication device and the second server, the second communication processor verifies the second signed data based on the seventh key, and signs the second certificate signing request by the second key to issue a fourth certificate if verification of the second signed data is successful, the second communication processor transmits the fourth certificate to the first server via the second communicator and the operation terminal, and the first communication processor executes an authentication process for the first server being a source of the issue request based on the fourth certificate.

8. The communication device according to claim 1, wherein the first communication processor transmits a registration request of the first communication processor to the first server via the first communicator and receives first registration information from the first server via the first communicator, the first communication processor receives, from the first server via the first communicator, a notification including authorization data indicating that the user permitted acquisition of user information that is information acquirable under authority of the user, the first communication processor transmits an acquisition request of the user information from the first server via the first communicator, wherein the acquisition request includes the first registration information and the authorization data, and the first communication processor acquires the user information from the first server via the first communicator if the first communication processor receives a permission for the acquisition request from the first server via the first communicator, and the first communication processor determines that the source of the issue request is legitimate if the first communication processor acquires the user information, and permits access to the first communication processor.

9. The communication device according to claim 1, wherein the first key is a public key, the second key is a secret key, the third key is a key paired with a seventh key had by the second server.

10. The communication device according to claim 2, wherein the fourth key is a secret key different from the second key.

11. The communication device according to claim 6, wherein the fifth key is a public key and the sixth key is a secret key.

12. The communication device according to claim 6, wherein the third certificate is a temporary self-signed server certificate.

13. The communication device according to claim 7, wherein the fourth certificate is a client certificate.

14. A communication system comprising:

the communication device according to claim 1; and the second server, wherein the second server transmits the target data to the communication device through the first server, the second server receives the signed data from the communication device through the first server, and the second server verifies the signed data based on a seventh key paired with the third key.

15. A communication method performed by a communication device for providing a resource of a first device to a user, the communication device including: a first communicator connectable to a first network and capable of communicating with a first server through the first network; and a second communicator connectable to a second network and capable of communicating with an operation terminal of the user through the second network, wherein the operation terminal is able to communicate with the first server through the first network, the method comprising:

receiving an issue request of a certificate from the first server via the second communicator and the operation terminal;

issuing a certificate signed by a second key of a key pair including a first key and the second key, wherein the certificate issued includes identification information of a first communication processor of the communication device and the first key, the identification information is included in the certification for a subject attribute of the certificate;

signing a target data by a third key to generate signed data, the target data being included in the issue request or previously shared between the communication device and a second server, the second server being capable of communicating with the first server;

transmitting the signed data and the certificate to the first server via the second communicator and the operation terminal, wherein the certificate is installed in the operation terminal by the first server after the signed data is verified by the second server; and presenting information inquiring whether issuance of the certificate is permitted to the user and acquiring information indicating whether issuance of the certificate was permitted;

executing the authentication process with the operation terminal, via the first communicator and the first server, based on the certificate issued if a command of execution of the first process is received from the operation terminal via the first server and the first communicator;

issuing the certification only when the acquired information indicates that the user permitted the issuance of the certification or controlling to execute the authentication process only when the acquired information indicates that the user has permitted the issuance of the certification; and executing, by the first communication processor, a first process for providing the resource of the first device to the user via the first communicator.

16. The communication device according to claim 15, further comprising:

generating a certificate signing request instead of issuing the certificate, wherein the certificate signing request includes: the identification information of the first communication processor for the subject of issuance of the certification and the first key;

transmitting the certificate signing request and the signed target data via the second communicator, the operating terminal, and the first server;

receiving a second certificate resulting from that the certificate signing request is signed by a fourth key in the second server from the second server via the first server, the operation terminal, and the second communicator;

presenting information inquiring whether issuance of the certificate signing request or the second certificate is permitted to the user;

generating the certificate signing request only when the user has permitted to issue the certificate signing request or the second certificate; and executing the authentication process based on the second certificate if the first communication processer receives the command of execution of the first process.

17. A non-transitory computer readable medium having a computer program stored therein which when executed by a computer of a communication device for providing a resource of a first device to a user, the communication device including: a first communicator capable of communicating with a first server through the first network and a second communicator capable of communicating with an operation terminal of the user through the second network wherein the operation terminal is able to communicate with the first server through the first network, causing the computer to performing processes comprising:

receiving an issue request of a certificate from the first server via the second communicator and the operation terminal;

issuing a certificate signed by a second key of a key pair including a first key and the second key, wherein the certificate issued includes identification information of a first communication processor of the communication device and the first key, the identification information is included in the certification for a subject attribute of the certificate;

signing a target data by a third key to generate signed data, the target data being included in the issue request or previously shared between the communication device and a second server, the second server being capable of communicating with the first server;

transmitting the signed data and the certificate to the first server via the second communicator and the operation terminal, wherein the certificate is installed in the operation terminal by the first server after the signed data is verified by the second server; and presenting information inquiring whether issuance of the certificate is permitted to the user and acquiring information indicating whether issuance of the certificate was permitted;

executing the authentication process with the operation terminal, via the first communicator and the first server, based on the certificate issued if a command of execution of the first process is received from the operation terminal via the first server and the first communicator;

issuing the certification only when the acquired information indicates that the user permitted the issuance of the certification or controlling to execute the authentication process only when the acquired information indicates that the user has permitted the issuance of the certification; and executing, by the first communication processor, a first process for providing the resource of the first device to the user via the first communicator.

18. The non-transitory computer readable medium according to claim 17, the computer program causing to perform processes further comprising:

generating a certificate sinning request instead of issuing the certificate, wherein the certificate signing request includes: the identification information of the first communication processor for the subject of issuance of the certification and the first key;

transmitting the certificate signing request and the signed target data via the second communicator, the operating terminal, and the first server;

receiving a second certificate resulting from that the certificate signing request is signed by a fourth key in the second server from the second server via the first server, the operation terminal, and the second communicator;

presenting information inquiring whether issuance of the certificate signing request or the second certificate is permitted to the user;

generating the certificate signing request only when the user has permitted to issue the certificate signing request or the second certificate; and executing the authentication process based on the second certificate if the first communication processer receives the command of execution of the first process.

* * * * *